United States Patent
Sato et al.

(10) Patent No.: US 12,109,492 B2
(45) Date of Patent: Oct. 8, 2024

(54) NON-TRANSITORY COMPUTER READABLE MEDIUM, GAME DEVICE, AND INFORMATION PROCESSING METHOD

(71) Applicant: CYGAMES, INC., Tokyo (JP)

(72) Inventors: Kazuki Sato, Tokyo (JP); Aya Yokoyama, Tokyo (JP)

(73) Assignee: CYGAMES, INC., Tokyo (JP)

( * ) Notice: Subject to any disclaimer, the term of this patent is extended or adjusted under 35 U.S.C. 154(b) by 195 days.

(21) Appl. No.: 17/646,089

(22) Filed: Dec. 27, 2021

(65) Prior Publication Data

US 2022/0118360 A1 Apr. 21, 2022

Related U.S. Application Data

(63) Continuation of application No. PCT/JP2020/024844, filed on Jun. 24, 2020.

(30) Foreign Application Priority Data

Jun. 28, 2019 (JP) ................................. 2019-122494

(51) Int. Cl.
*A63F 13/56* (2014.01)
*A63F 13/2145* (2014.01)

(52) U.S. Cl.
CPC .......... *A63F 13/56* (2014.09); *A63F 13/2145* (2014.09)

(58) Field of Classification Search
CPC ...... A63F 13/2145; A63F 13/23; A63F 13/40; A63F 13/426; A63F 13/44; A63F 13/45;
(Continued)

(56) References Cited

U.S. PATENT DOCUMENTS 8,845,432 B2 * 9/2014 O ........................... A63F 13/426
463/31
9,975,047 B2 * 5/2018 Hamano ............... A63F 13/537
(Continued)

FOREIGN PATENT DOCUMENTS

| JP | 2017113426 A | 6/2017 |
| JP | 2018114289 A | 7/2018 |
| JP | 2019076642 A | 5/2019 |

OTHER PUBLICATIONS

6-Lane Game. Uta Macross Sma-Pho De Culture Official Wiki, Aug. 23, 2018, in particular, pp. 1-2, "Switching to 6- ane Game", "New Functions of 6-Lane Game" (5 pages).
(Continued)

*Primary Examiner* — Omkar A Deodhar
(74) *Attorney, Agent, or Firm* — Osha Bergman Watanabe & Burton LLP

(57) ABSTRACT

A non-transitory computer readable medium stores a program causing a computer to execute: displaying a target object on each of mutually spaced positions on the touchscreen; moving a specific object from a prescribed start position to target objects that are adjacent to each other among the plurality of target objects, the specific object simultaneously arriving at the adjacent target objects; detecting a prescribed operation input to the touchscreen in connection with the moving specific object; determining whether or not the prescribed operation is input within a validity determination area including at least the adjacent target objects and an area therebetween; and determining whether or not the prescribed operation is input at a prescribed timing.

4 Claims, 37 Drawing Sheets

(58) Field of Classification Search
CPC .......... A63F 13/50; A63F 13/52; A63F 13/55; A63F 13/56; A63F 13/57; A63F 13/58; A63F 13/70; A63F 13/79
See application file for complete search history.

(56) References Cited

U.S. PATENT DOCUMENTS

| | | | |
|---|---|---|---|
| 2012/0071241 A1 | 3/2012 | O | |
| 2013/0012321 A1* | 1/2013 | Yamamoto | A63F 13/573 463/37 |
| 2022/0118360 A1* | 4/2022 | Sato | A63F 13/35 |

OTHER PUBLICATIONS

[Uta-Macross cheat site] FAQ! Check it out if your are a beginner! BoomAppGames, Japan, Aug. 20, 2017, [Online], [Retrived Dec. 26, 2019] URL; https://games.boom-app.com/entry/uta-macross-play-13 (8 pages).

Shoichiro Ueno?Research for aiding an improvement of rhythm gaming skills based on a practice using visualization of model operations?2018 Undergraduate Bachelor thesis of School of Media Science, Tokyo Univ. of Technology?Jan. 2019, Japan?[Online], [retrived: Dec. 26, 2019]?URL?https://gamescience.jp/2018/index.html (33 pages).

[BanG Dream!]Tips for low-skilled players using only thumbs, gadget, & smart-phone game life, Soten-ni nagae, Jun. 15, 2019, Japan [Online], [retrived: Dec. 26, 2019] URL; https://enohpresident.com/bangdream-zyoutatu/ (26 pages).

Office Action issued in Japanese Application No. 2019-122494; Dated Jan. 14, 2020 (4 pages).

Office Action issued in Japanese Application No. 2019-122494; Dated Jun. 23, 2020 (4 pages).

Office Action issued in Japanese Application No. 2019-122494; Dated Sep. 23, 2020 (4 pages).

International Search Report issued in International Application No. PCT/JP2020/024844, mailed Aug. 4, 2020 (6 pages).

Written Opinion issued in International Application No. PCT/JP2020/024844; Dated Aug. 4, 2020 (4 pages).

* cited by examiner

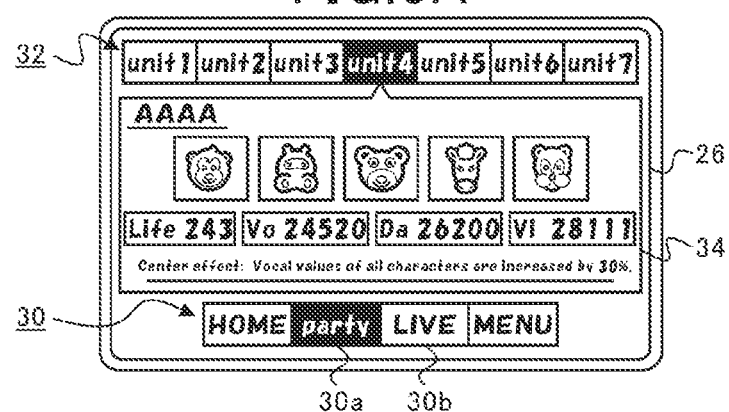

FIG.7A

| PIECE OF MUSIC NO. | SETTING AREAS | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| No. 1 |   | T | T | T |   | T | T | T | T |   | T | T | T | T |   |
| No. 2 |   | T | T |   |   | T | T | T |   |   |   | T | T |   | T |
| No. 3 | T | T | T | T | T | T | T | T | T | T | T | T | T | T | T |

FIG.7B

| FIRST STORAGE UNIT | SECOND STORAGE UNIT | THIRD STORAGE UNIT |
|---|---|---|
| SECOND PARTY INFORMATION | FOURTH PARTY INFORMATION | SEVENTH PARTY INFORMATION |

FIG.7C

| STORAGE AREAS | | | | | | | | | | | | | | |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |
|   |   |   |   |   |   |   |   |   |    |    |    |    |    |    |

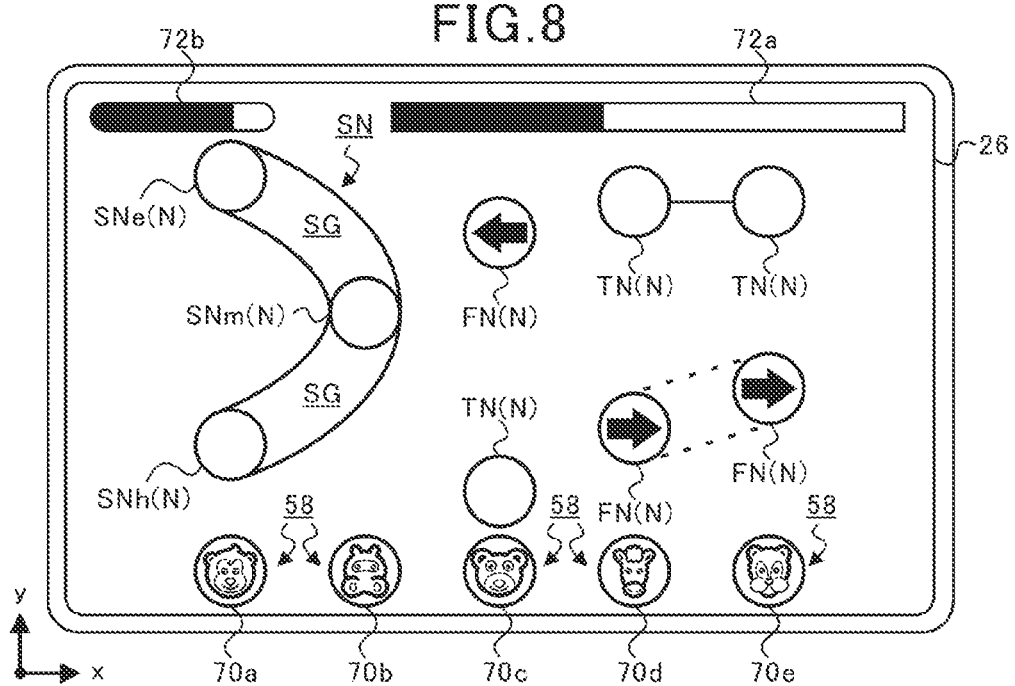

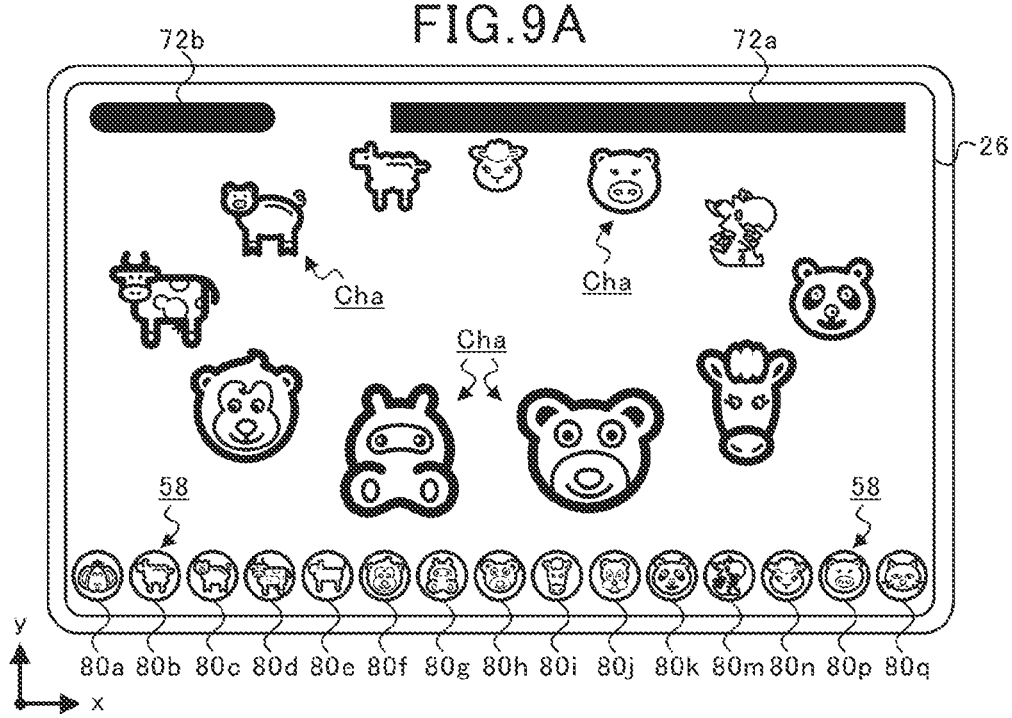

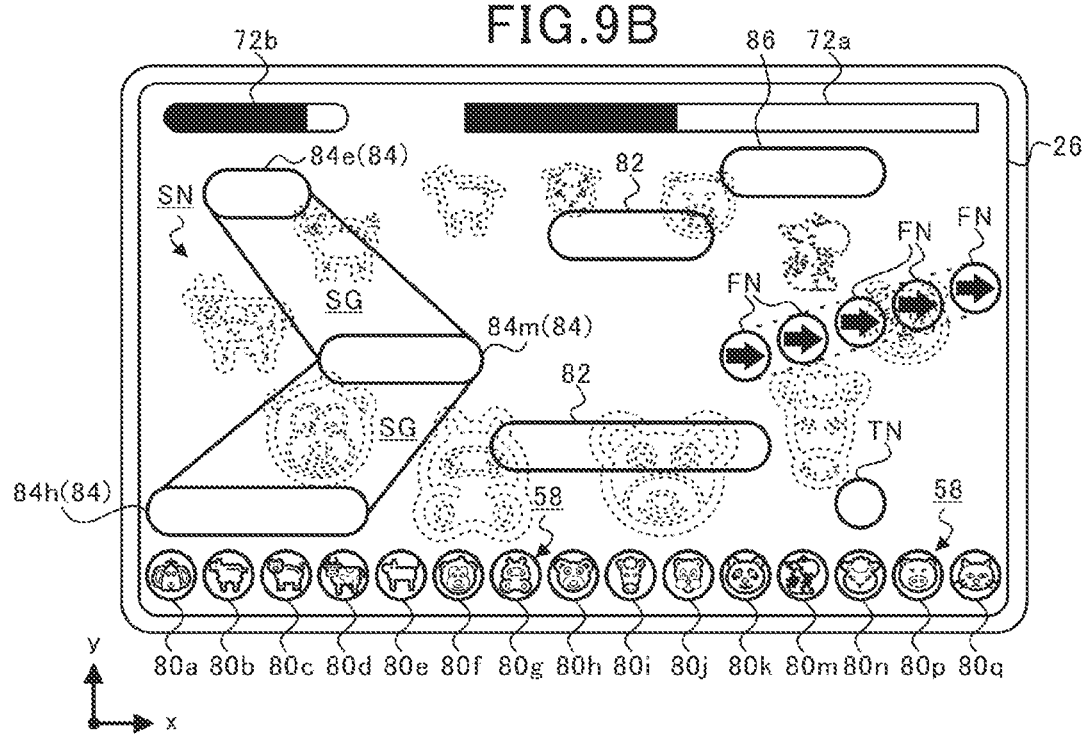

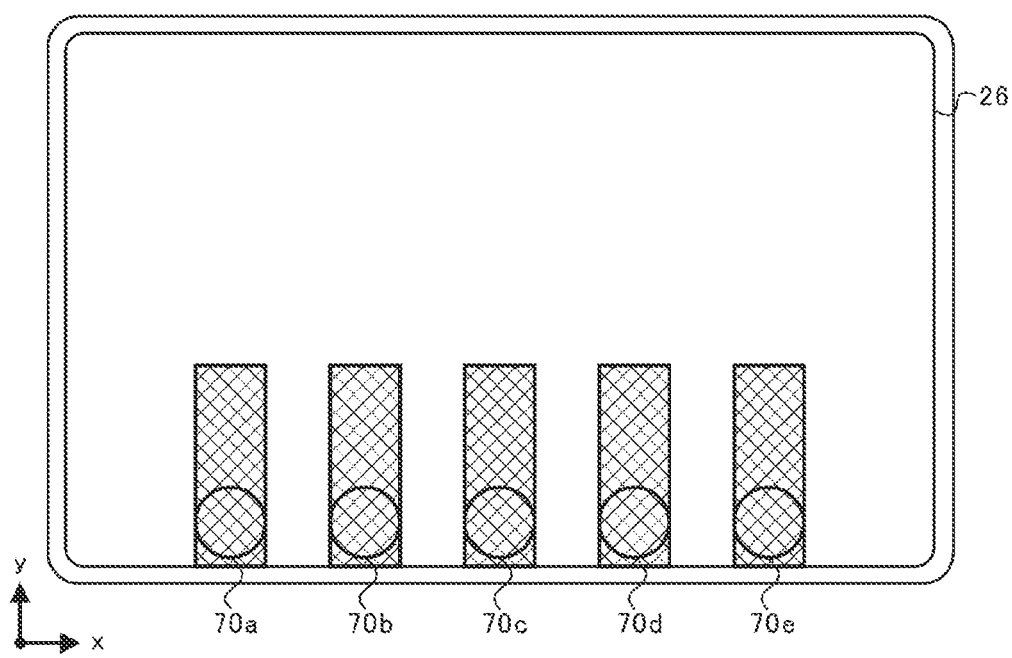

FIG.15A

| FRAME | OPERATION-INFORMATION STORAGE UNIT | | | |
|---|---|---|---|---|
| | 1st STORAGE AREA | 2nd STORAGE AREA | 3rd STORAGE AREA | 4th STORAGE AREA |
| 0F | x:356 y:32 | | x:554 y:38 | |
| −1F | x:356 y:32 | | x:556 y:38 | |
| −2F | x:358 y:33 | | x:556 y:40 | |
| −3F | x:359 y:35 | | x:558 y:41 | |
| −4F | x:360 y:35 | | x:558 y:40 | |
| −5F | x:360 y:36 | | | |
| −6F | x:365 y:36 | | | |
| −7F | x:367 y:34 | | | |
| −8F | x:370 y:34 | | | |
| −9F | x:372 y:32 | | | |
| DETERMINATION SUBJECT INFORMATION | SN(No. 13) | | SN(No. 14) | |

FIG.15B

| INPUT FRAME (F) | OPERATION-INFORMATION STORAGE UNIT | | | |
|---|---|---|---|---|
| | 1st STORAGE AREA | 2nd STORAGE AREA | 3rd STORAGE AREA | 4th STORAGE AREA |
| 0F | x:354 y:33 | x:1265 y:48 | | |
| −1F | x:356 y:32 | | ~~x:554 y:38~~ | |
| −2F | x:356 y:32 | | ~~x:556 y:38~~ | |
| −3F | x:358 y:33 | | ~~x:557 y:40~~ | |
| −4F | x:359 y:35 | | ~~x:558 y:41~~ | |
| −5F | x:360 y:35 | | ~~x:558 y:40~~ | |
| −6F | x:360 y:36 | | | |
| −7F | x:365 y:36 | | | |
| −8F | x:367 y:34 | | | |
| −9F | x:370 y:34 | | | |
| DETERMINATION SUBJECT INFORMATION | SN(No. 13) | SN(No. 15) | ~~SN(No. 14)~~ | |

NON-TRANSITORY COMPUTER READABLE MEDIUM, GAME DEVICE, AND INFORMATION PROCESSING METHOD

CROSS REFERENCE TO RELATED APPLICATIONS

This application is a continuation application of International Application No. PCT/JP2020/024844, filed on Jun. 24, 2020, which claims priority to Japanese Patent Application No. 2019-122494, filed on Jun. 28, 2019, the entire contents of which are incorporated by reference herein.

BACKGROUND ART

Technical Field

The present invention relates to information processing programs, game devices, and information processing methods.

What are called rhythm games, in which a touch panel is operated in synchronization with a piece of music, have hitherto been known, as disclosed, for example, in Patent Literature 1. In such a rhythm game, a target object indicating the position of an operation by a player is displayed, and an instruction object called a note is displayed so as to move toward the target object. The player can recognize the operation position, the operation timing, and the operation mode via the instruction object.

CITATION LIST

Patent Literature

Patent Literature 1: JP 2017-113426 A

SUMMARY OF INVENTION

Technical Problem

In the rhythm game described above, if the number of target objects is increased, for example, for the purpose of making the appearance luxurious, the gap between mutually adjacent target objects becomes narrower. This results in the problem that the operational feeling for the player is compromised.

It is an object of the present invention to provide an information processing program, a game device, and an information processing method that make it possible to improve the operational feeling for a player.

Solution to Problem

In order to solve the problem described above, an information processing program causes a computer to function as: an operation-information deriving unit that derives prescribed operation information on the basis of the input of an operation to a touchscreen; a target-object display unit that, on the basis of targets set at mutually spaced positions, causes target objects corresponding to the targets to be displayed on the touchscreen; an object display unit that causes a specific object corresponding to a plurality of mutually adjacent targets among the targets to be displayed such that the specific object moves from a prescribed display start position and simultaneously arrives at the plurality of targets; a validity determination unit that performs validity determination for the operation on the basis of a validity determination area and the operation information, the validity determination area at least including a plurality of target objects corresponding to the targets at which the specific object arrives and each area between the plurality of target objects; and a timing determination unit that determines whether or not the input of the operation was performed at a prescribed timing.

Furthermore, with the information processing program, each of the targets may have set therefor a corresponding area that is larger than a display area of the corresponding target object and that at least includes the midpoint between the target itself and a target located adjacent thereto, and the validity determination area may be set on the basis of the corresponding area.

Furthermore, the information processing program may further cause the computer to function as a game-mode switching unit that performs switching between a first game mode, in which the specific object may appear, and a second game mode, in which the number of target objects displayed is fewer than in the first game mode, the object display unit may cause a non-specific object to be displayed so as to move in the second game mode, the non-specific object being an object that arrives at only one of the targets from the display start position, and the specific object may be arranged so as not to appear in the second game mode.

In order to solve the problem described above, a game device includes: an operation-information deriving unit that derives prescribed operation information on the basis of the input of an operation to a touchscreen; a target-object display unit that, on the basis of targets set at mutually spaced positions, causes target objects corresponding to the targets to be displayed on the touchscreen; an object display unit that causes a specific object corresponding to a plurality of mutually adjacent targets among the targets to be displayed such that the specific object moves from a prescribed display start position and simultaneously arrives at the plurality of targets; a validity determination unit that performs validity determination for the operation on the basis of a validity determination area and the operation information, the validity determination area at least including a plurality of target objects corresponding to the targets at which the specific object arrives and each area between the plurality of target objects; and a timing determination unit that determines whether or not the input of the operation was performed at a prescribed timing.

In order to solve the problem described above, an information processing method includes: a step of deriving prescribed operation information on the basis of the input of an operation to a touchscreen; a step of causing, on the basis of targets set at mutually spaced positions, target objects corresponding to the targets to be displayed on the touchscreen; a step of causing a specific object corresponding to a plurality of mutually adjacent targets among the targets to be displayed such that the specific object moves from a prescribed display start position and simultaneously arrives at the plurality of targets; a step of performing validity determination for the operation on the basis of a validity determination area and the operation information, the validity determination area at least including a plurality of target objects corresponding to the targets at which the specific object arrives and each area between the plurality of target objects; and a step of determining whether or not the input of the operation was performed at a prescribed timing.

Effects of Disclosure

The present invention makes it possible to improve the operational feeling for a player.

BRIEF DESCRIPTION OF DRAWINGS

FIG. 3A is an illustration showing an example party formation screen.

FIG. 7A is a diagram for explaining area attribute information.

FIG. 7B is a diagram for explaining a selected-party-information storage unit.

FIG. 7C is a diagram for explaining a character-ID storage unit.

FIG. 8 is a diagram for explaining an example rhythm game in the normal mode.

FIG. 9A is an illustration for explaining an example rhythm game in the special mode.

FIG. 9B is an illustration for explaining example specific notes.

FIG. 11A is an illustration for explaining a tap determination area.

FIG. 15A is a first diagram for explaining an operation-information storage unit.

FIG. 15B is a second diagram for explaining an operation-information storage unit.

DESCRIPTION OF EMBODIMENTS

An aspect of an embodiment of the present invention will be described below in detail with reference to the accompanying drawings. The dimensions, materials, specific numerical values, etc. given in this embodiment are merely examples for facilitating understanding and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

(Overall Configuration of Information Processing System S)

Figure 1:
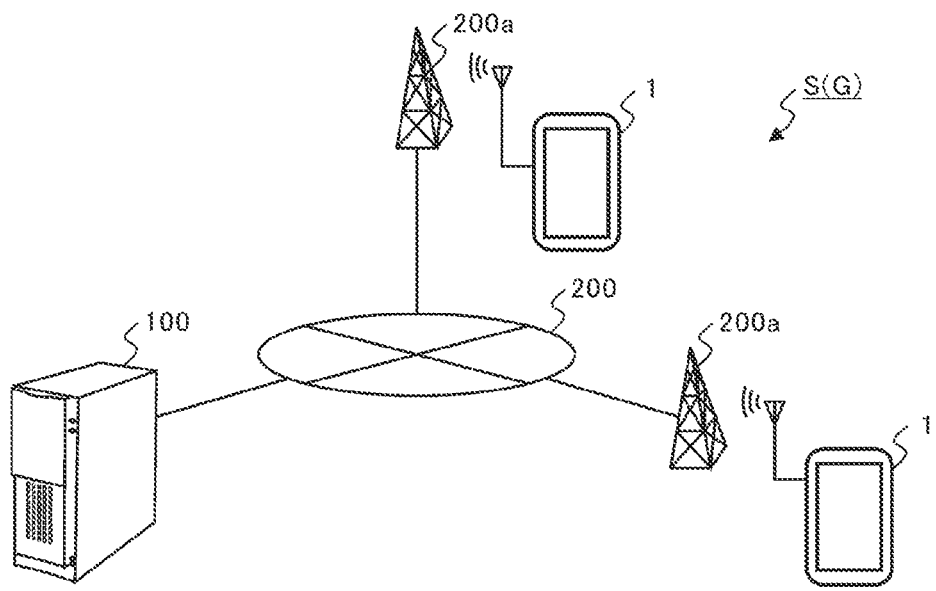
FIG. 1 is an illustration schematically showing the configuration of an information processing system.

FIG. 1 is an explanatory illustration schematically showing the configuration of an information processing system S. The information processing system S is what is called a client-server system including player terminals 1, a server 100, and a communication network 200 having communication base stations 200a.

The player terminals 1 can establish communication with the server 100 via the communication network 200. The player terminals 1 include a wide range of electronic appliances that are capable of communicatively connecting to the server 100 in a wireless or wired manner. Examples of the player terminals 1 include smartphones, mobile phones, tablet devices, personal computers, and game machines. This embodiment will be described in the context of a case where smartphones are used as the player terminals 1.

The server 100 is communicatively connected to the plurality of player terminals 1. The server 100 accumulates various kinds of information (player information) for each player who plays a game. Furthermore, the server 100 updates the accumulated information on the basis of operations input from the player terminals 1.

The communication base stations 200a are connected to the communication network 200, and send information to and receive information from the player terminals 1 in a wireless manner. The communication network 200 is implemented by a mobile phone network, an Internet network, a local area network (LAN), a special circuit, or the like, and realizes wireless or wired communication connection between the player terminals 1 and the server 100.

In the information processing system S in this embodiment, the player terminals 1 and the server 100 function as a game device G. The player terminals 1 and the server 100 individually share roles for controlling the proceeding of the game, and it becomes possible to proceed with the game through cooperation between the player terminals 1 and the server 100.

(Hardware Configurations of Player Terminals 1 and Server 100)

Figure 2A:
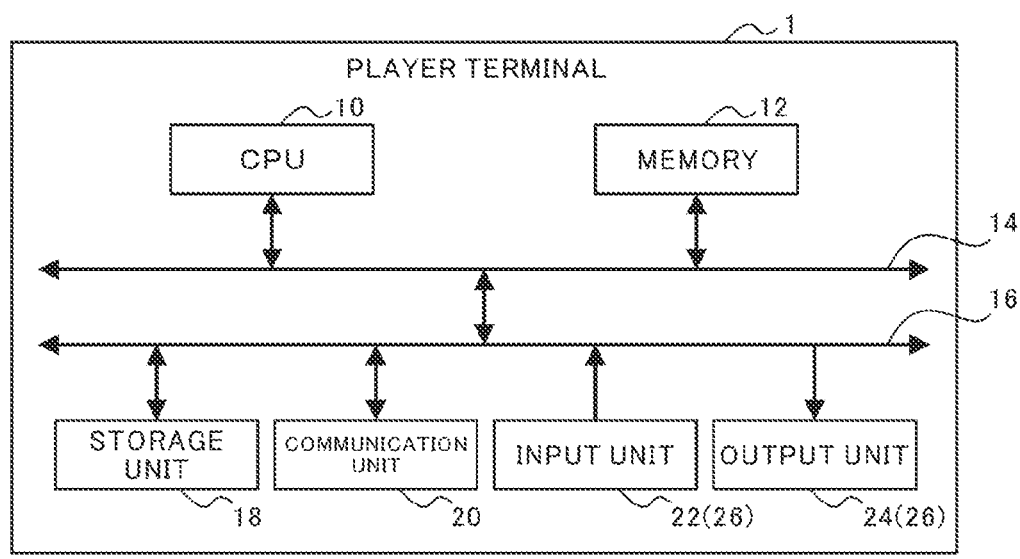
FIG. 2A is a diagram for explaining the hardware configuration of a player terminal.
Figure 2B:
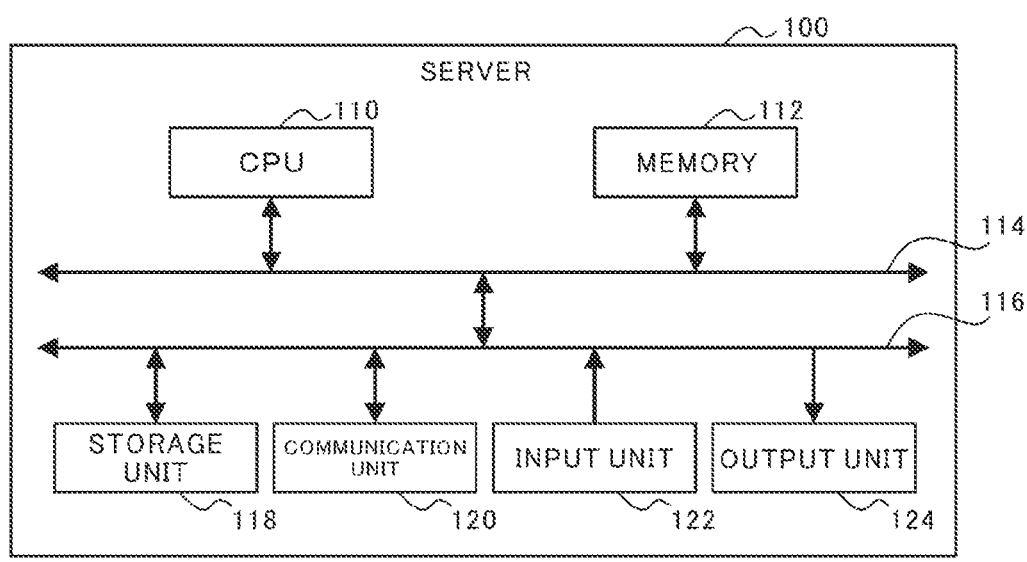
FIG. 2B is a diagram for explaining the hardware configuration of a server.

FIG. 2A is a diagram illustrating the hardware configuration of a player terminal 1. Furthermore, FIG. 2B is a diagram illustrating the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

Note that the configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24 of the player terminal 1, respectively. Therefore, the following description will be directed to the hardware configuration of the player terminal 1, while omitting a description of the server 100.

The CPU 10 runs a program stored in the memory 12 to control the proceeding of the game. The memory 12 is configured of a read only memory (ROM) or a random access memory (RAM) and stores the program and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory such as a dynamic random access memory (DRAM) and stores various kinds of programs and data. In the player terminal 1, the programs and data stored in the storage unit 18 are loaded into the memory 12 (RAM) by the CPU 10.

The communication unit 20 is communicatively connected to a communication base station 200*a* in a wireless manner, and sends information to and receives information from the server 100 via the communication network 200, such as various kinds of data and programs. In the player terminal 1, programs, etc. received from the server 100 are stored in the memory 12 or the storage unit 18.

The input unit 22 is configured of a unit via which player operations are input (operations are accepted), such as a touchscreen, buttons, a keyboard, a mouse, a cross keypad, or an analog controller. Furthermore, the input unit 22 may be a special controller provided at the player terminal 1 or connected (externally) to the player terminal 1. Alternatively, the input unit 22 may be configured of an acceleration sensor that detects tilting or movement of the player terminal 1 or a microphone that detects the player's voice. That is, the input unit 22 includes a wide range of devices that enable the input of the player's intents in distinguishable manners.

The output unit 24 is configured to include a display device and a speaker. Note that the output unit 24 may be a device connected (externally) to the player terminal 1. In this embodiment, the player terminal 1 includes a touchscreen 26 that functions as the input unit 22 and the output unit 24.

(Game Specifics)

Next, the specifics of the game provided by the information processing system S (game device G) in this embodiment will be described by using an example. Before starting the game, the player downloads a special application program in advance from the server 100 to the player terminal 1 and registers the player ID in the server 100. Upon the activation of the application, the player terminal 1 receives information stored in the server 100, such as party information and play history information, which will be described later, and displays a game screen on the touchscreen 26. In this embodiment, the player can play a rhythm game by using a party formed of a plurality of (five here) characters possessed by the player.

Figure 3B:
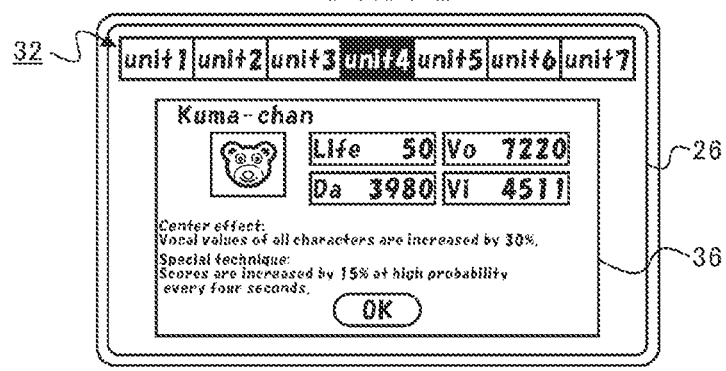
FIG. 3B is an illustration showing an example character information page.

FIG. 3A is an illustration showing an example party formation screen. FIG. 3B is an illustration showing an example character information page. Upon the activation of the application, a home screen, which is not shown, is displayed on the touchscreen 26. In the home screen, a menu bar 30 constituted of a plurality of tabs is displayed, as shown in FIG. 3A. The player can switch the display screen on the touchscreen 26 by tapping the tabs in the menu bar 30.

When a first tab 30*a* in the menu bar 30 is tapped, the party formation screen shown in FIG. 3A is displayed. In the party formation screen, a unit switching bar 32 constituted of seven unit tabs is displayed. In this embodiment, seven kinds of party information in total, namely, first party information to seventh party information, are stored in a party-information storage unit in the memory 12. The party information is configured to include a party name and five medium IDs. The player can edit the party name for each party.

Furthermore, the medium IDs include, for example, a character ID for identifying a character, which is assigned to each character, various kinds of parameters including a level and an appeal value, which will be described later, and character information indicating a costume and ornaments worn by the character. The player can possess a plurality of medium IDs having the same character IDs and having different values of the various kinds of parameters. Note that it is not allowed to include multiple instances of the same medium ID in one party. That is, the party information includes five different medium IDs.

Meanwhile, the party information may include different medium IDs associated with the same character ID. Therefore, there are cases where medium IDs having the same character ID are included in one party. In this case, the character ID may be used as-is for one of the medium IDs having the same character ID, while changing the character ID for the other medium IDs such that there are no duplicates within the party. Hereinafter, it is assumed that different character IDs are associated with all medium IDs. In other words, it is assumed here that character IDs and medium IDs have one-to-one relationships. Therefore, in the following description, medium IDs are sometimes referred to as characters or character IDs.

Each of the unit tabs corresponds to one of the seven kinds of party information, and a party information page 34 corresponding to a tapped unit tab is displayed. Furthermore, the tapped unit tab is displayed in a highlighted manner so that the player can readily recognize the corresponding relationship between the unit tab and the party information.

In the party information page 34, the party name (AAAA here), five character icons representing the characters included in the party, various kinds of parameters of the party, and a center effect are displayed. Here, as the parameter of the party, a life value (indicated as "Life" in the figure) and three kinds of appeal values (indicated as "Vo", "Da", and "Vi" in the figure) are provided.

When one of the character icons is tapped in the party information page 34, a character selection screen, which is not shown, is displayed. Although not described in detail, the player can select one of the characters possessed by the player in the character selection screen. The character selected in the character selection screen is substituted for the character selected by the player in the party information page 34 (the character corresponding to the character icon tapped in the party information page 34).

In this case, the character information corresponding to the character before the substitution is updated to the character information corresponding to the character after the substitution. Note that in the character selection screen, the player is not allowed to select the medium IDs (i.e., characters) included in the currently selected party information.

Furthermore, when one of the character icons is held down in the party information page 34, the character information page 36 shown in FIG. 3B is displayed. In the character information page 36, various kinds of parameters of the character and an explanation of the abilities of the character are displayed. Note that similarly to the party information page 34, the character information page 36 is also displayed in the case where one of the character icons displayed in the character selection screen described above is held down.

As described earlier, each character has set therefor four parameters, namely, a life value as well as three appeal values consisting of a vocal value (Vo), a dance value (Da), and a visual value (Vi). The player can improve the values of these individual parameters by training the character. The player can play the rhythm game more advantageously as the values of the parameters become greater.

Furthermore, each character has set therefor in advance a "center effect" and a "special technique" as abilities. The "center effect" and the "special technique" are both a privilege that works advantageously in the rhythm game, and a plurality of kinds are provided individually. Note, however, that in the rhythm game, the center effect is effective only for the characters located at the center among the five characters included in one party. Meanwhile, the "special technique" is effective irrespective of the position of the character.

As described above, the player can check the parameters and abilities of each character by displaying the character information page 36 in the party formation screen. Furthermore, as shown in FIG. 3A, the parameters of the party are displayed in the party information page 34, which represent the total values of the parameters of the characters included in the party. Furthermore, in the party information page 34, the center effect of the character located at the center of the party is displayed as the center effect of the party.

Figure 4A:
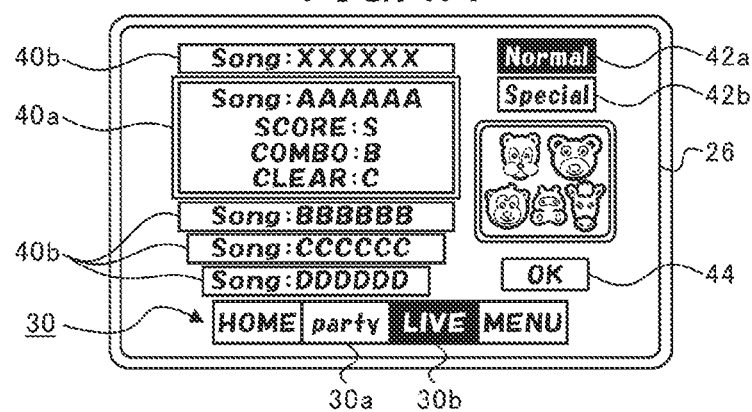
FIG. 4A is an illustration showing an example game selection screen in the state where a normal mode is tentatively selected.
Figure 4B:
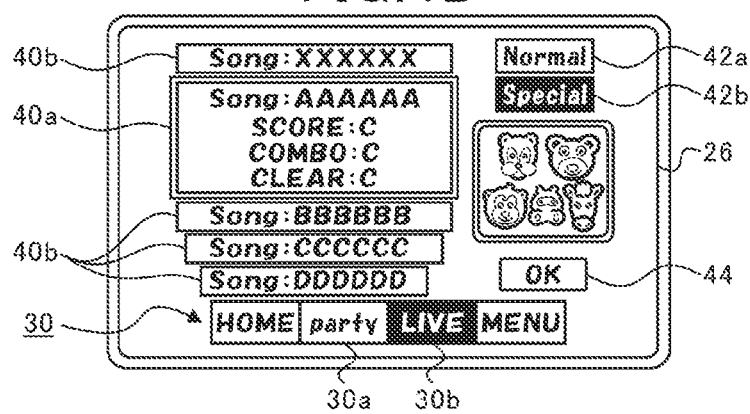
FIG. 4B is an illustration showing an example game selection screen in the state where a special mode is tentatively selected.

FIG. 4A is an illustration showing an example game selection screen in the state where a normal mode is tentatively selected. FIG. 4B is an illustration showing an example game selection screen in the state where a special mode is tentatively selected. When a second tab 30b in the menu bar 30 is tapped, the game selection screen shown in FIG. 4A or FIG. 4B is displayed.

The game selection screen is a screen for selecting the kind of game in the rhythm game. Here, a plurality of kinds of game in which different pieces of music are played back in the rhythm game and having different game modes, which will be described later, are provided. That is, in this embodiment, at least either the pieces of music or the game modes vary among the individual kinds of game. Although not described in detail, a plurality of kinds of game with different difficulty levels may be provided for the same piece of music and game mode.

In the game selection screen, a piece-of-music information tab 40a, title display tabs 40b, a normal-mode selection tab 42a, a special-mode selection tab 42b, and a determination tab 44 are displayed. In the piece-of-music information tab 40a, information concerning the kind of game tentatively selected is displayed. That is, in the piece-of-music information tab 40a, the title of the piece of music tentatively selected and the play history information of the kind of game tentatively selected are displayed. Furthermore, while the game selection screen is displayed, a part of the piece of music tentatively selected is repeatedly played back.

Above and below the piece-of-music information tab 40a, a plurality of title display tabs 40b are displayed. In the title display tabs 40b, only the title of the piece of music is displayed. When a selection operation (a flick operation in the up/down direction) is performed in the area where the piece-of-music information tab 40a and the title display tabs 40b are displayed, the title that is displayed is shifted in the direction of the operation. Accordingly, the piece of music tentatively selected is changed, and the content displayed in the piece-of-music information tab 40a is also changed. Furthermore, in the case where a selection operation of tapping one of the title display tabs 40b is performed, the piece of music tentatively selected is changed to the piece of music corresponding to the tapped title display tab 40b.

The normal-mode selection tab 42a and the special-mode selection tab 42b are provided in order to switch the game mode. In this embodiment, a plurality of game modes including the normal mode and the special mode are provided. As will be described later in detail, the normal mode is a game mode in which one party, i.e., five characters, is used in the rhythm game, and the special mode is a game mode in which three parties, i.e., fifteen characters, are used in the rhythm game.

When a selection operation of tapping the normal-mode selection tab 42a is performed, the normal mode is stored as the tentatively selected game mode, and the normal-mode selection tab 42a is displayed in a highlighted manner, as shown in FIG. 4A. Meanwhile, when a selection operation of tapping the special-mode selection tab 42b is performed, the special mode is stored as the tentatively selected game mode, and the special-mode selection tab 42b is displayed in a highlighted manner, as shown in FIG. 4B. When the tentatively selected game mode is changed, the play history information displayed in the piece-of-music information tab 40a is changed, as shown in FIGS. 4A and 4B.

When the determination tab 44 is tapped, selection information indicating the tentatively selected piece of music and game mode is set in a selection-information storage unit in the memory 12, and a setting screen is displayed on the touchscreen 26. As the setting screen, a normal-mode setting screen and a special-mode setting screen are provided.

Figure 5:
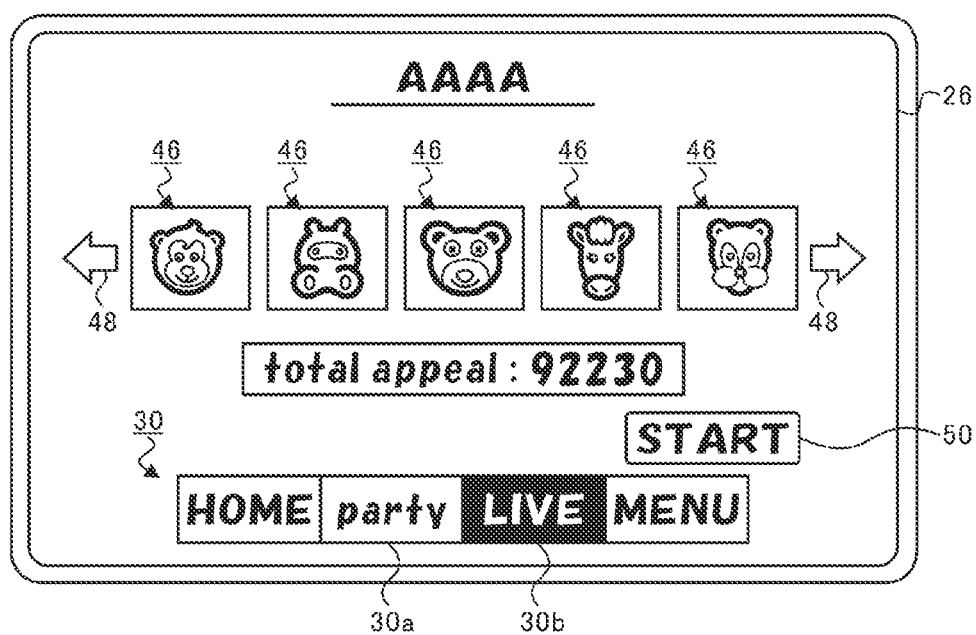
FIG. 5 is an illustration for explaining an example normal-mode setting screen.

FIG. 5 is an illustration showing an example normal-mode setting screen. When the determination tab 44 is tapped in the state where the normal mode is tentatively selected, the normal-mode setting screen shown in FIG. 5 is displayed on the touchscreen 26. When the normal-mode setting screen is displayed, one of the seven kinds of party information stored in the party-information storage unit in the memory 12 is set in a selected-party-information storage unit in the memory 12. Here, the party information to be set in the selected-party-information storage unit is selected according to a preset condition, such as the party information having the greatest total appeal value or the party information used in the previous session of the rhythm game.

Then, the party name (AAAA here) and the total appeal value of the party are displayed in the normal-mode setting screen on the basis of the party information set in the selected-party-information storage unit. The total appeal value displayed in the normal-mode setting screen is a value in which a registered piece of music, the center effect, etc. are reflected.

Furthermore, five identification images 46 representing the characters included in the party are displayed in the normal-mode setting screen. When one of the identification images 46 is tapped in the normal-mode setting screen, similarly to the party information page 34 described earlier, a character selection screen, which is not shown, is displayed, which makes it possible to change the characters included in the party. Furthermore, in the case where one of the identification images 46 is held down, the character information page 36 shown in FIG. 3B is displayed.

Furthermore, two switching tabs 48 are displayed in the normal-mode setting screen. When one of the switching tabs 48 is tapped, the party information stored in the selected-party-information storage unit is changed to other party information. Furthermore, as the party information stored in the selected-party-information storage unit is changed, the party name, the total appeal value, and the identification images 46 displayed in the normal-mode setting screen are changed. Then, when a start tab 50 displayed in the normal-mode setting screen is tapped, the rhythm game is started. Note that in the case where the number of items of character information (medium IDs) included in the party information stored in the selected-party-information storage unit is less than five, the start tab 50 is grayed out, which indicates that it is not allowed to start the rhythm game.

Figure 6A:
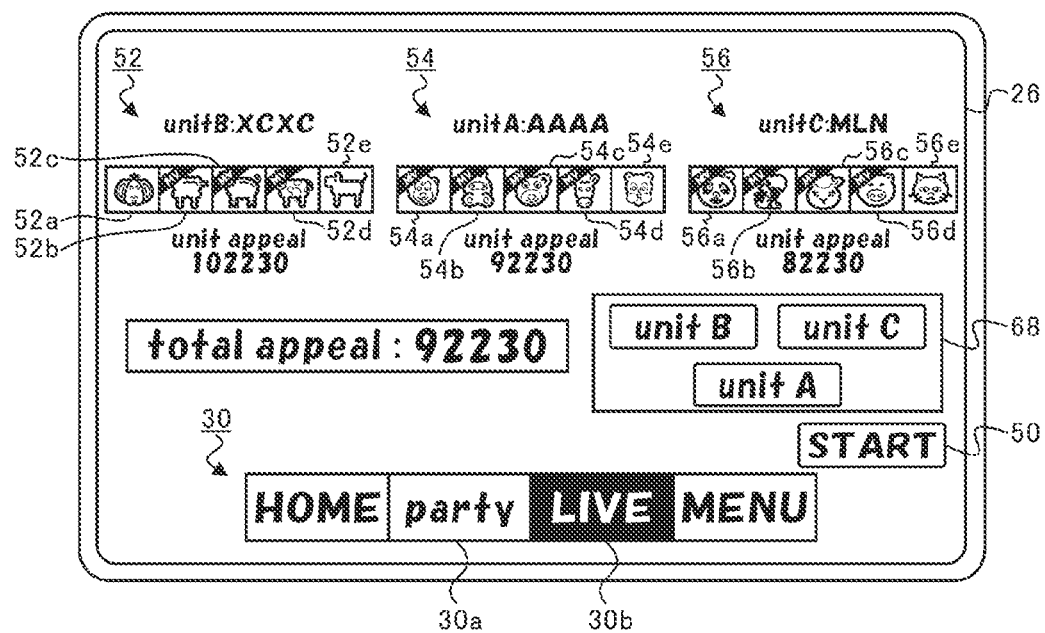
FIG. 6A is an illustration for explaining an example special-mode setting screen.
Figure 6B:
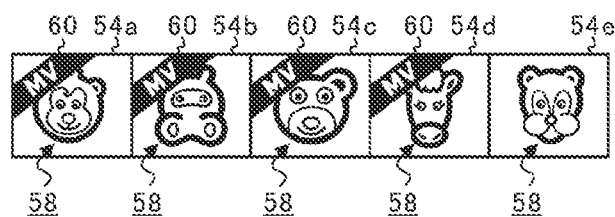
FIG. 6B is an illustration for explaining example report images.
Figure 6C:
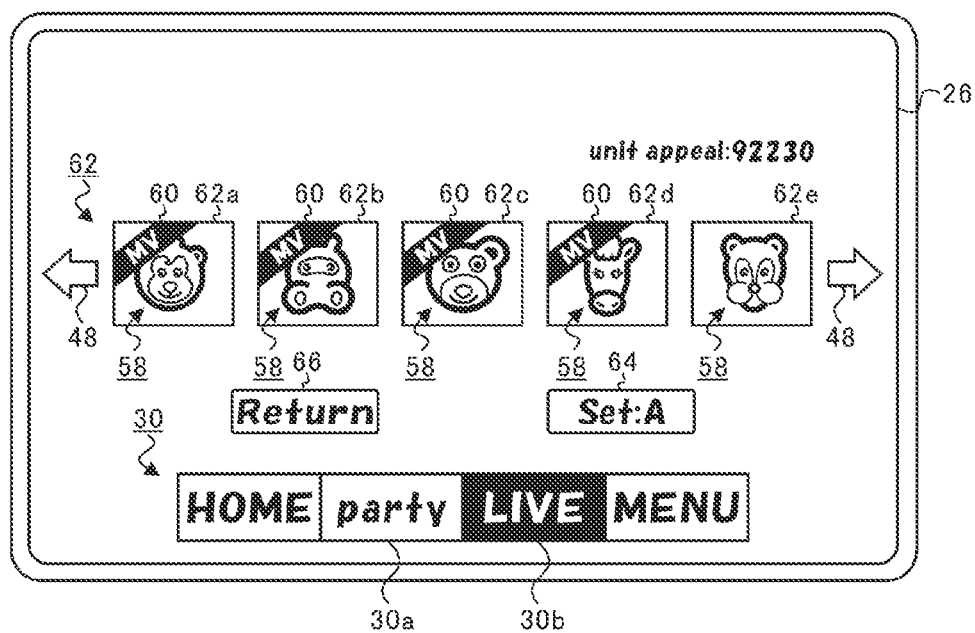
FIG. 6C is an illustration for explaining an example party selection screen.

FIG. 6A is an illustration showing an example special-mode setting screen. FIG. 6B is an illustration showing example report images 60. FIG. 6C is an illustration showing an example party selection screen. When the determination tab 44 is tapped in the state where the special mode is tentatively selected, the special-mode setting screen shown in FIG. 6A is displayed on the touchscreen 26.

When the special-mode setting screen is displayed, three of the seven kinds of party information stored in the party-information storage unit in the memory 12 are set in the selected-party-information storage unit in the memory 12. Note that the three kinds of party information are selected from the seven kinds of party information according to a preset condition.

In the special-mode setting screen, a left party display area 52, a middle party display area 54, and a right party display area 56 are provided, as shown in FIG. 6A. In these three display areas, for each of the three items of party information set in the selected-party-information storage unit, information concerning the party, such as the party name and the total appeal value of the party, is displayed.

Furthermore, in the left party display area 52, a first setting area 52a, a second setting area 52b, a third setting area 52c, a fourth setting area 52d, and a fifth setting area 52e are provided. Furthermore, in the middle party display area 54, a sixth setting area 54a, a seventh setting area 54b, an eighth setting area 54c, a ninth setting area 54d, and a tenth setting area 54e are provided. Furthermore, in the right party display area 56, an eleventh setting area 56a, a twelfth setting area 56b, a thirteenth setting area 56c, a fourteenth setting area 56d, and a fifteenth setting area 56e are provided. Hereinafter, the fifteen areas, namely, the first setting area 52a to the fifteenth setting area 56e, will be simply referred to as setting areas.

In each of the setting areas, an identification image 58 that is set correspondingly to a character ID is displayed, as shown in FIG. 6B. The identification images 58 are formed of icon images simulating the characters used in the rhythm game. It is possible to identify the characters included in each party on the basis of the identification images 58 displayed in the individual setting areas.

Here, during the rhythm game, a music video is displayed in synchronization with a piece of music that is played back. The music video is a game screen generated at either the server 100 or the player terminal 1. In the rhythm game in the normal mode described above, one party, i.e., five characters, are used. Furthermore, during the rhythm game in the normal mode, a music video in which one of the five characters included in the party appears is displayed. Meanwhile, in the rhythm game in the special mode, three parties, i.e., fifteen characters, are used. Furthermore, during the rhythm game in the special mode, a music video in which a maximum of fifteen characters appear is displayed.

That is, it can be said that the special mode is a game mode in which the number of characters that appear in a music video is greater compared with the normal mode, i.e., the music video is luxurious. Therefore, the ratio occupied by the purpose of enjoying a music video in the purpose of playing the rhythm game is greater in the special mode than in the normal mode.

Note that the number of characters that appear in a music video varies depending on the piece of music. In other words, depending on the piece of music, all the characters used in the rhythm game do not appear in a music video. That is, the characters selected by the player may include both characters that appear in a music video and characters that do not appear in the music video.

Thus, in the special-mode setting screen, characters that appear in a music video are reported to the player by means of report images 60 that are displayed in the setting areas. Specifically, the report images 60 are formed of ribbons denoted as "MV", and are displayed in the top left parts of the setting areas. Hereinafter, the setting areas in which the report images 60 are displayed will be referred to as object display areas.

In a music video, the characters corresponding to the identification images 58 displayed in the object display areas appear. Therefore, in the example shown in FIG. 6A, the eleven characters for which the identification images 58 are displayed in the second setting area 52b, the third setting area 52c, the fourth setting area 52d, the sixth setting area 54a, the seventh setting area 54b, the eighth setting area 54c, the ninth setting area 54d, the eleventh setting area 56a, the twelfth setting area 56b, the thirteenth setting area 56c, and the fourteenth setting area 56d appear in a music video.

When one of the left party display area 52, the middle party display area 54, and the right party display area 56 is tapped in the special-mode setting screen, the party selection screen shown in FIG. 6C is displayed. FIG. 6C shows the party selection screen in the case where the middle party display area 54 is tapped in FIG. 6A. In the party selection screen, information concerning the party selected in the special-mode setting screen (for which the display area is tapped) is displayed.

Specifically, a selected-party display area 62 is provided in the party selection screen. In the selected-party display area 62, a first selection area 62a, a second selection area

62*b*, a third selection area 62*c*, a fourth selection area 62*d*, and a fifth selection area 62*e* are provided. Hereinafter, the five areas, namely, the first selection area 62*a* to the fifth selection area 62*e*, will be simply referred to as selection areas.

As shown in FIG. 6C, in each of the selection areas, an identification image 58 that is set correspondingly to a character ID is displayed. Thus, the player can recognize the characters included in the currently selected party also in the party selection screen. Note that as is apparent from FIGS. 6A and 6C, the order of display of the identification images 58 displayed in the selection areas in the party selection screen is the same as the order of display of the identification images 58 displayed in the setting areas in the special-mode setting screen.

Furthermore, the report images 60 are displayed in the selection areas also in the party selection screen. The positions of the report images 60 displayed in the party selection screen coincide with the positions of the report images 60 displayed in the special-mode setting screen. Thus, the player can readily recognize which characters appear in a music video also in the party selection screen.

Furthermore, in the party selection screen, the two switching tabs 48, a set tab 64, and a back tab 66 are displayed. When one of the switching tabs 48 is displayed, party information that is different from the party information stored in the selected-party-information storage unit is tentatively registered. Furthermore, the identification images 58 displayed in the selection areas in the party selection screen are changed on the basis of the tentatively registered party information.

When the set tab 64 is tapped, the tentatively registered party information is set in the selected-party-information storage unit in the memory 12. Therefore, for example, in the case where the middle party display area 54 is tapped in the special-mode setting screen and the party is changed in the party selection screen, the party corresponding to the middle party display area 54 is changed.

Furthermore, when the set tab 64 is tapped, the special-mode setting screen is displayed on the touchscreen 26. At this time, if the party information has been changed, the special-mode setting screen is displayed on the basis of the changed party information. That is, in the case where the party information has been changed, the identification images 58 displayed in the setting areas are changed. As described above, the party selection screen makes it possible to change the party that is used in the rhythm game.

Note that when the back tab 66 is tapped, the special-mode setting screen that is the same as that before displaying the party selection screen is displayed. Even if one of the items of party information is tentatively registered in the party selection screen, in the case where the back tab 66 is tapped, the selected-party-information storage unit in the memory 12 is not updated.

Furthermore, as shown in FIG. 6A, a layout-information display section 68 is provided in the special-mode setting screen. The layout-information display section 68 shows the positional relationships among the three parties that appear in a music video. This enables the player to recognize the positions of the individual characters in the music video.

Furthermore, the total appeal value of the three parties are displayed in the special-mode setting screen. In the special mode, an appeal value in which the center effect, etc. is reflected is calculated for each of the three parties, and the average of the three calculated appeal values is displayed as the total appeal value. Then, the rhythm game is started when the start tab 50 displayed in the special-mode setting screen is tapped.

Note that in the case where the number of items of the character information (medium IDs) included in the party information stored in the selected-party-information storage unit is less than fifteen, the start tab 50 is grayed out, which indicates that it is not allowed to start the rhythm game. Furthermore, the start tab 50 is grayed out also in the case where items of party information including the same character information (medium ID) are included in the three items of party information, in other words, also in the case where the same medium IDs are included in the fifteen medium IDs.

Note that in the case where one of the selection areas is held down in the party selection screen, the character selection screen described above is displayed. When the characters are changed in the character selection screen, the identification images 58 corresponding to the changed characters are displayed in the selection areas in the party selection screen.

Since it is reported in the special-mode setting screen which setting areas are object display areas, as described above, the player can readily select characters that appear in a music video. Furthermore, the operational feeling in the preparatory stage before starting the rhythm game is improved, which alleviates stress given to the player. Note that although the report images 60 are displayed in the special-mode setting screen here, the report images 60 may be displayed also in the normal-mode setting screen, similarly to the above.

(Processing for Displaying Special-Mode Setting Screen)

Figure 7C:
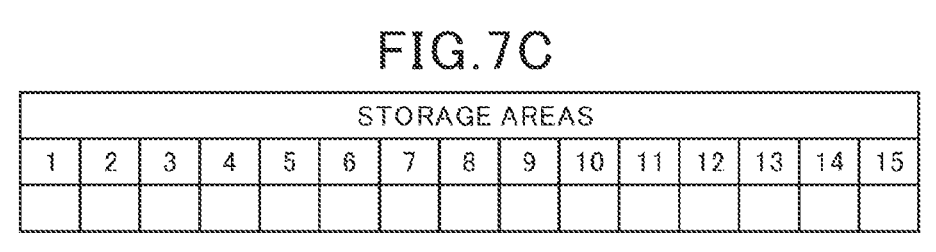

Next, processing for displaying the special-mode setting screen will be described by using an example. FIG. 7A is a diagram for explaining area attribute information. FIG. 7B is a diagram for explaining the selected-party-information storage unit. FIG. 7C is a diagram for explaining a character-ID storage unit. The memory 12 stores area attribute information. The area attribute information is information that makes it possible to identify which of the fifteen setting areas described earlier are object display areas, and the area attribute information is provided for each piece of music (kind of game).

In FIG. 7A, object display areas are denoted as "T", and setting areas that are not object display areas are indicated by blank. As an example, the area attribute information of piece of music No. 1 indicates that the setting areas other than the first setting area 52*a*, the fifth setting area 52*e*, the tenth setting area 54*e*, and the fifteenth setting area 56*e* are object display areas. As another example, the area attribute information of piece of music No. 3 indicates that all the setting areas are object display areas.

Note that, for example, the area attribute information may be defined by using an integer n ($1 \leq n \leq 15$), and setting areas with numbers 1 to n may be considered as object display areas.

Furthermore, the selected-party-information storage unit in the memory 12 includes three storage units, namely, a first storage unit, a second storage unit, and a third storage unit, as shown in FIG. 7B. The selected-party-information storage unit stores some of the first party information to the seventh party information. The three storage units individually store party information when the special-mode setting screen is displayed, and only the first storage unit stores party information when the normal-mode setting screen is displayed.

Furthermore, the character-ID storage unit in the memory 12 includes a plurality of storage areas each corresponding to one setting area among the fifteen setting areas, which mutually varies, as shown in FIG. 7C. In FIG. 7C, a first storage area to a fifteenth storage area indicated by numbers 1 to 15 respectively correspond to the first setting area 52a to the fifteenth setting area 56e. These storage areas store character IDs. Note that these storage areas may store not only character IDs but also character information such as parameters of the individual characters.

When party information is stored in the selected-party-information storage unit, character IDs are stored in the character-ID storage unit on the basis of the party information stored in the party-information storage unit. The first storage area to the fifth storage area in the character-ID storage unit correspond to the first storage unit in the selected-party-information storage unit. Similarly, the sixth storage area to the tenth storage area in the character-ID storage unit correspond to the second storage unit in the selected-party-information storage unit, and the eleventh storage area to the fifteenth storage area in the character-ID storage unit correspond to the third storage area in the selected-party-information storage unit.

Furthermore, when the normal mode is selected, character IDs are stored in the first storage area to the fifth storage area on the basis of the party information stored in the first storage unit in the selected-party-information storage unit. When the special mode is selected, character IDs are stored in the first storage area to the fifth storage area on the basis of the party information stored in the first storage unit in the selected-party-information storage unit, character IDs are stored in the sixth storage area to the tenth storage area on the basis of the party information stored in the second storage unit in the selected-party-information storage unit, and character IDs are stored in the eleventh storage area to the fifteenth storage area on the basis of the party information stored in the third storage unit in the selected-party-information storage unit.

Furthermore, when the normal-mode setting screen and the special-mode setting screen are displayed, the identification images 58 are displayed in the individual corresponding setting areas on the basis of the character IDs stored in the individual storage areas in the character-ID storage unit. Furthermore, when the special-mode setting screen is displayed, area attribute information is obtained, and the report images 60 are displayed in the individual setting areas on the basis of the obtained area attribute information.

Furthermore, in the case where one of the left party display area 52, the middle party display area 54, and the right party display area 56 is tapped in the special-mode setting screen shown in FIG. 6A, the character IDs corresponding to the tapped display area are obtained from the character-ID storage unit. Then, the identification images 58 are displayed in the individual selection areas in the party selection screen shown in FIG. 6C on the basis of the obtained character IDs.

Furthermore, when the party selection screen is displayed, the area attribute information corresponding to the display area tapped in the special-mode setting screen is obtained, and the report images 60 are displayed in the individual selection areas on the basis of the obtained area attribute information. For example, in the case where the middle party display area 54 is tapped, the five items of area attribute information in the sixth setting area 54a to the tenth setting area 54e are obtained among the area attribute information corresponding to the selected piece of music No., and the report images 60 are displayed in the individual selection areas on the basis of these items of area attribute information.

Note that there are cases where a selection area is held down while the party selection screen is displayed, whereby the character selection screen is displayed, and characters are changed in the character selection screen. In such a case, the party information in the party-information storage unit is changed, and the character IDs in the character-ID storage unit are changed on the basis of the changed party information.

As described above, in the preparatory stage of the rhythm game, the special-mode setting screen (setting screen) including a plurality of setting areas is displayed. The special-mode setting screen enables the player to change the party or to change the characters. Furthermore, in the special-mode setting screen, some of the plurality of identification images 58 individually provided correspondingly to a plurality of character IDs are displayed in the setting areas on the basis of a player operation. At this time, in the special-mode setting screen, which of the plurality of setting areas are object display areas is reported by means of the report images 60.

Furthermore, a party selection screen that makes it possible to select party information including a prescribed number of (five here) character IDs, the prescribed number being greater than or equal to two, is displayed. The identification images 58 are displayed in the setting areas in the special-mode setting screen on the basis of the party information selected in the party selection screen. Furthermore, in the party selection screen, the identification images 58 displayed in object display areas in the special-mode setting screen are reported.

The processing described above makes it possible to suitably select a music video preferred by the player even in the case where the characters used in the rhythm game partially differ from the characters that appear in the music video.

(Description of Rhythm Game)

Next, the specifics of the rhythm game will be described by using an example. The following description will first be directed to the rhythm game in the normal mode and will then be directed to the rhythm game in the special mode.

(Specifics of Rhythm Game in Normal Mode)

FIG. 8 is an illustration for explaining an example rhythm game in the normal mode. During the rhythm game, music is output from a speaker serving as a kind of the output unit 24 at the player terminal 1. Furthermore, although not shown in FIG. 8, a music video in which characters appear is played back and is displayed on the touchscreen 26 in synchronization with the music output from the speaker.

Although not described in detail, the music video is a game screen that is generated correspondingly to the kind of game (piece of music), the game mode, the distinction between 2D and 3D, and the image quality such as high image quality or low image quality. That is, a plurality of music videos are generated for one kind of game. The player can preset information for identifying a music video to be generated in a prescribed menu screen.

Furthermore, in the rhythm game in the normal mode, five target objects are displayed in a lower section of the touchscreen 26. Here, the individual target objects displayed in the rhythm game in the normal mode are a first target object 70a, a second target object 70b, a third target object 70c, a fourth target object 70d, and a fifth target object 70e.

The individual target objects are displayed in a manner superimposed on a music video. The target objects have a higher priority set therefor than the music video, and are thus always displayed on the front side of the image of the music video. Furthermore, in the rhythm game in the normal mode, five shared target coordinate points are set irrespective of the piece of music, i.e., irrespective of the kind of game. Each of the five target objects is displayed in a certain range centered at one of the target coordinate points on the touchscreen 26. Therefore, the center positions of the five target objects shown in FIG. 8 individually serve as the five target coordinate points.

Specifically, in FIG. 8, coordinates along the horizontal direction are considered as x coordinates, and coordinates along the vertical direction are considered as y coordinates. The five target coordinate points are set equally spaced from each other along the x-axis direction, and the y coordinates thereof are all the same. That is, the five target coordinate points are set such that the x coordinates thereof vary and such that the y coordinates thereof are the same.

Here, identification images 58 are displayed as the target objects. That is, it can be said that the identification images 58 themselves are the target objects. The five identification images 58 are determined on the basis of the character IDs set in the character-ID storage unit (see FIG. 7C). When the rhythm game in the normal mode is started, character IDs are set in the first storage area to the fifth storage area. The first storage area to the fifth storage area in the character-ID storage unit respectively correspond to the first target object 70a to the fifth target object 70e.

Therefore, for example, the identification image 58 corresponding to the character ID stored in the third storage area in the character-ID storage unit is displayed as the third target object 70c, and the identification image 58 corresponding to the character ID stored in the fifth storage area in the character-ID storage unit is displayed as the fourth target object 70d.

Note that although the five target objects are spaced from each other along the x-axis direction here, the target objects themselves may be in contact with each other. In this case, however, it is preferable that the player can recognize the boundary between two adjacent target objects.

Furthermore, the target coordinate points described above serve as the arrival points of notes N. In the rhythm game, a plurality of kinds of notes N are displayed so as to move from upper to lower on the touchscreen 26, and finally arrive at one of the target coordinate points. In other words, a note N necessarily corresponds to one of the target coordinate points, and the note N moves toward the corresponding target coordinate point. In the rhythm game, when a target object is operated, a prescribed sound (hereinafter referred to as an operation sound) is momentarily output. When the operation sound is output at the timing when a note N arrives at a target coordinate point (target object), an impression as if the sound were played in synchronization with music is given.

In this embodiment, five kinds of notes N, namely, a tap note TN, a flick note FN, a head slide note SNh, a middle slide note SNm, and an end slide note SNe, are provided. Furthermore, here, a set including a head slide note SNh and an end slide note SNe will be referred to as a slide note set SN.

All the notes N that are displayed in the rhythm game in the normal mode have a truly circular shape and have the same display area. Furthermore, all the five target objects that are displayed in the normal mode have a truly circular shape and have the same display area as the notes N. Therefore, the notes N and the target objects that are displayed in the rhythm game in the normal mode all have the same shape. Alternatively, however, the notes N and the target objects may have different shapes or display areas on a per-kind basis.

Each note N has an associated operation mode, and the player has to perform the operation associated with the note N at a prescribed timing. Specifically, a tap operation is associated with the tap note TN as the operation mode. Note that a tap operation in this embodiment refers to the start of a new operational input (contact) on the touchscreen 26 serving as the input unit 22. Therefore, in this embodiment, for example, in the case where the touchscreen 26 is held down, the start of the hold-down operation is also included in the tap operation.

A flick operation is associated with the flick note FN as the operation mode. Here, it is determined that a flick operation is input upon detecting an operation involving a continuous movement by a prescribed distance in the x-axis direction within a certain time and going beyond a prescribed target coordinate point in the x-axis direction. Alternatively, however, the condition for determining whether or not a flick operation is input is not limited to the above example, and may be set as appropriate. With the flick note FN, an arrow indicating left or right is displayed, as shown in the figure, which notifies the player of the direction of the flick operation.

A tap operation is associated with the head slide note SNh as the operation mode. Furthermore, a hold operation is associated with the middle slide note SNm as the operation mode. In this embodiment, the hold operation refers to a hold-down operation that is detected continuously without being interrupted and with which the positions where two successive operations are detected fall within a certain range on the touchscreen 26. Therefore, for example, in the case where contact is maintained simultaneously at a plurality of different positions on the touchscreen 26, since the positions of successively detected operations do not fall within the certain range, the plurality of operations is not considered as a hold operation.

An unhold operation is associated with the end slide note SNe as the operation mode. In this embodiment, the unhold operation refers to the termination of the above-described hold operation, i.e., a hold-down operation. Therefore, an unhold operation is necessarily preceded by a hold operation, and a hold operation is necessarily preceded by a tap operation.

The slide note set SN is constituted of a plurality of notes N having different timings of starting display on the touchscreen 26, different timings of arrival at target coordinate points, and different timings of removal from the touchscreen 26. In the slide note set SN, the note N that is displayed first, i.e., the note N at the head, serves as the head slide note SNh, and the note N that is displayed last, i.e., the note N at the tail, serves as the end slide note SNe.

Furthermore, in the case where the slide note set SN is configured to include three or more notes N, the notes N disposed between the head slide note SNh and the end slide note SNe serve as middle slide notes SNm. As described above, a slide note set SN includes at least a head slide note SNh and an end slide note SNe.

Note that the head slide note SNh, the middle slide note SNm, and the end slide note SNe all have the same display mode as the tap note TN (white truly circular shape). However, the notes N constituting the slide note set SN are joined with slide guides SG. A slide guide SG is displayed across two notes N that are successive in the order of display, and is displayed so as to move together with the notes N.

Therefore, it can be said that slide guides SG suggest slide directions and optimal movement speeds to the player. Furthermore, slide guides SG enable the player to distinguish among the tap note TN, the head slide note SNh, the middle slide note SNm, and the end slide note SNe.

As described above, a note N is an object (displayed object) that instructs an operation mode, an operation timing, and an operation position to the player. In the rhythm game, the player is required to input operations according to notes N. Furthermore, each note N has a determination period set therefor, and when an operation associated with the note N is input within the determination period in relation to the target object that the note N arrives, points are awarded on the basis of the input timing. The points acquired in this manner are accumulated, and the accumulated points are reported in a score bar 72*a* provided in an upper section of the touchscreen 26.

Furthermore, a life bar 72*b* is provided in an upper section of the touchscreen 26. The life bar 72*b* visually indicates the remaining life value of the party, and the rhythm game is over when the life value becomes zero. The life value decreases in the case where an operation associated with a note N is not input at a suitable timing. Furthermore, there are some characters having an ability to increase the life value when a prescribed condition is satisfied, and the life value may increase in the case where such characters are included in the party.

(Specifics of Rhythm Game in Special Mode)

Next, the rhythm game in the special mode will be described. FIG. 9A is an illustration for explaining an example rhythm game in the special mode. FIG. 9B is an illustration for explaining example specific notes. Also in the rhythm game in the special mode, similarly to the normal mode, during the rhythm game, music is output from the speaker, and a music video is played back and is displayed on the touchscreen 26 in synchronization with the music output from the speaker.

At this time, a large number of characters (character objects, denoted by reference sign Cha in FIG. 9A) appear in the music video, as shown in FIG. 9A. The characters that appear in the music video are the characters corresponding to the identification images 58 displayed in the object display areas in the special-mode setting screen (see FIG. 6A) before the rhythm game is started. In FIG. 9B, the characters that appear in the music video are indicated by broken lines for convenience of description.

Furthermore, in the rhythm game in the special mode, fifteen target objects are displayed in a lower section of the touchscreen 26. Here, the target objects displayed in the rhythm game in the special mode will be individually referred to as the n-th target objects (n is an integer from one to fifteen). Here, the first target object is disposed leftmost on the touchscreen 26, and the value of n increases toward the right side. Furthermore, the n-th target objects will be described with reference signs 80*a* to 80*q* individually assigned thereto, as shown in the figure. Note that the roles, purposes, and functions of the target objects are the same between the normal mode and the special mode. Therefore, in order to avoid repeated descriptions, the target objects will be described below only with respect to differences between the special mode and the normal mode.

In the rhythm game in the special mode, fifteen shared target coordinate points are set irrespective of the piece of music, i.e., irrespective of the kind of game. Each of the fifteen target objects is displayed in a certain range centered at one of the target coordinate points on the touchscreen 26. Therefore, the center positions of the fifteen target objects shown in FIG. 9A individually serve as the fifteen target coordinate points. The fifteen target coordinate positions are set equally spaced from each other along the x-axis direction, and have the same y coordinates.

Here, identification images 58 are displayed as the target objects. The identification images 58 that serve as the target objects are determined on the basis of the character IDs set in the character-ID storage unit (see FIG. 7C). When the rhythm game in the special mode is started, character IDs are set in the first storage area to the fifteenth storage area in the character-ID storage unit. The first storage area to the fifteenth storage area in the character-ID storage unit respectively correspond to the first target object 80*a* to the fifteenth target object 80*q*.

Therefore, for example, the identification image 58 corresponding to the character ID stored in the first storage area in the character-ID storage unit is displayed as the first target object 80*a*, and the identification image 58 corresponding to the character ID stored in the tenth storage area in the character-ID storage unit is displayed as the tenth target object 80*j*.

Note that although the fifteen target objects are spaced from each other along the x-axis direction, the target objects themselves may be in contact with each other. In this case, however, it is preferable that the player can recognize the boundary between two adjacent target objects.

Since the number of target coordinate points (target objects) is greater in the special mode than in the normal mode, the spacing distance between adjacent target coordinate points (target objects) is shorter. Furthermore, the display area of each target object is also smaller than in the normal mode. Accordingly, it becomes difficult for the player to suitably operate the target objects, which compromises the operational feeling for the player. Thus, in order to alleviate such compromise in the operational feeling, in the rhythm game in the special mode, specific notes (specific objects) that are different from notes in the normal mode are provided.

As shown in FIG. 9B, a tap note 82, a head slide note 84*h*, a middle slide note 84*m*, an end slide note 84*e*, and a flick note 86 are provided as the specific notes. The tap note TN, the flick note FN, the head slide note SNh, the middle slide note SNm, and the end slide note SNe described earlier all have the same shapes as the target objects.

Meanwhile, the width of a specific note spans a plurality of target coordinate points and target objects. A specific note corresponds to a plurality of target coordinate points successively located along the x-axis direction, and the specific note is displayed so as to move from a prescribed display start position and arrives simultaneously at the plurality of target coordinate points.

As described above, a plurality of target coordinate points (target objects) at which a specific note arrives simultaneously all fall within an area in which player operations are enabled. Therefore, compared with a target object, a specific note has a larger area in which player operations are enabled. This serves to improve the operational feeling for the player even in the case where a large number of target objects are set.

Note that a single slide note set SN may include a plurality of specific notes having different widths, as shown in FIG. 9B, or a slide note set SN may be constituted of only specific notes having the same width. Furthermore, in the special mode, as well as specific notes, the tap note TN and the flick note FN having the same shape as the target objects may also appear, as shown in FIG. 9B.

However, in the special mode, the range along the x-direction in which operations on the tap note TN and the flick note FN are enabled is set to be larger compared with the normal mode. Note that in the special mode, the configuration may be such that only specific notes appear or such that a specific note with which a flick operation is associated is provided.

Furthermore, in this embodiment, switching is performed between the special mode (first game mode), in which specific notes may appear, and the normal mode (second game mode), in which the number of target objects displayed is less compared with the special mode. Furthermore, in the normal mode, only note N (non-specific objects) that arrive at only one of the target coordinate points from the display start position are displayed so as to move, and specific notes (specific objects) do not appear in the normal mode. Alternatively, however, specific notes may also appear in the normal mode.

Figure 10:
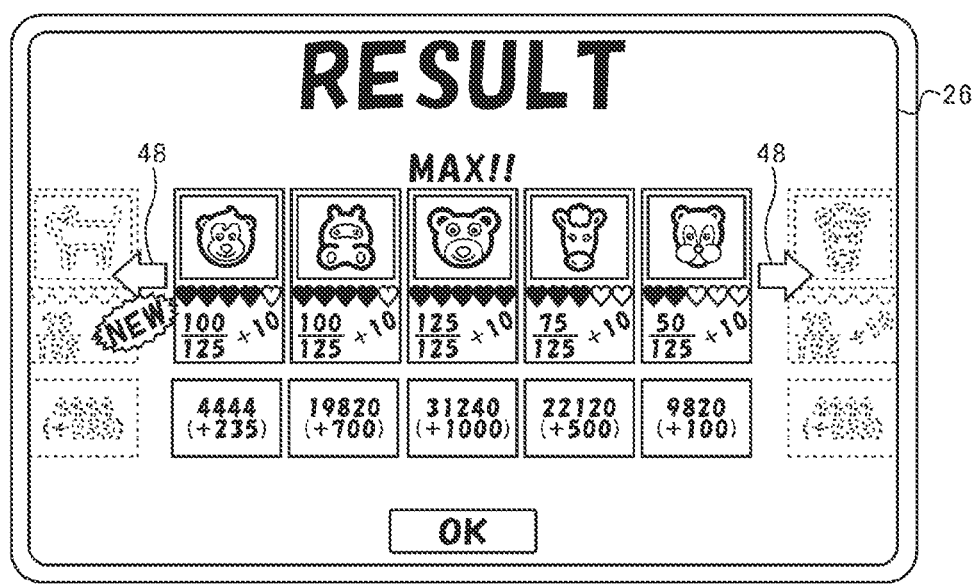
FIG. 10 is an illustration for explaining an example result display screen.

FIG. 10 is an illustration for explaining an example result display screen. When the rhythm game is finished, a result display screen such as the one shown in FIG. 10 is displayed on the touchscreen 26. In the rhythm game, the parameters, etc. of the characters used in the rhythm game increase on the basis of the total points acquired, the points associated with the individual identification images 58 (target objects), etc. At this time, a prescribed animation is displayed when one of the parameters of the characters exceeds a threshold.

In the rhythm game in the normal mode, various kinds of parameters of five characters are displayed in the result display screen. Meanwhile, the result display screen for the rhythm game in the special mode is constituted of three result pages. The result pages are provided for each party used in the rhythm game. Each of the result pages is configured as shown in FIG. 10, which is substantially the same as the result display screen for the rhythm game in the normal mode.

In the result display screen for the rhythm game in the special mode, one of the result pages is displayed on the touchscreen 26. At this time, the switching tabs 48 are displayed in a superimposed manner, and when one of the switching tabs 48 is tapped, another result page is displayed on the touchscreen 26. Furthermore, in the case where one of the parameters of a character displayed in a result page not displayed on the touchscreen 26 exceeds a threshold, "NEW" is displayed in the proximity of the switching tabs 48, as shown in FIG. 10. When one of the switching tabs 48 is tapped and the result page is switched, a prescribed animation is displayed immediately thereafter.

(Description of Determination Methods)

Next, methods of determining an operation in the normal mode and in the special mode will be described. In this embodiment, the method of determining an operation differs between the normal mode and the special mode. The following description will first be directed to the method of determining an operation in the normal mode, and will then be directed to the method of determining an operation in the special mode.

(Method of Determining Operation in Rhythm Game in Normal Mode)

Figure 11B:
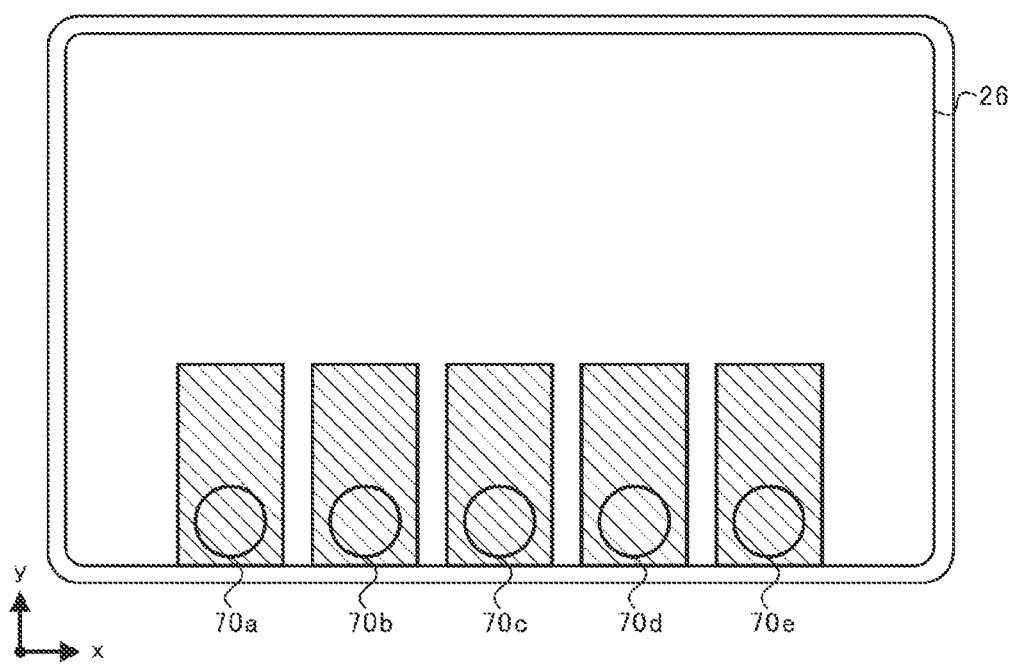
FIG. 11B is an illustration for explaining a slide determination area.

FIG. 11A is an illustration for explaining a tap determination area. FIG. 11B is an illustration for explaining a slide determination area. In the normal mode, as shown in FIG. 11A, five target objects, namely, the first target object 70a to the fifth target object 70e, are displayed on the basis of the target coordinate points. The center positions of the individual target objects serve as the five target coordinate points in the normal mode.

Each of the target coordinate points has set therefor a tap determination area indicated by cross hatching in FIG. 11A. The tap determination area includes one of the target coordinate points. In each tap determination area, the target coordinate point is located at the center along the x-axis direction. The width of the tap determination area along the x-axis direction is equal to the diameter of a target object. Meanwhile, the length of the tap determination area along the y-axis direction is greater than the diameter of a target object. Here, the tap determination area including the first target object 70a is considered as the first tap determination area, and the individual tap determination areas including the second target object 70b to the fifth target object 70e are considered as the n-th tap determination areas (n is an integer from 2 to 5).

In the normal mode, when an operation is input to the touchscreen 26, first, the operation mode of the input operation is identified. At this time, if the input operation is identified as a tap operation, it is determined which tap determination area includes the position thereof, and a lane is identified on the basis of the result of determination. Lanes correspond to the target coordinate points in one-to-one relationships, and here, five lanes, namely, a first lane to a fifth lane, are provided.

Specifically, in the case where the input operation is identified as a tap operation and it is determined that the position thereof is included in the first tap determination area, the first lane is identified. Similarly, in the case where it is determined that the position of the tap operation is included in the second tap determination area to the fifth tap determination area individually, the n-th lanes (n is an integer from two to five) are identified. Note that in the case where it is determined that the position of the tap operation is not included in any of the tap determination areas, the operation is handled as being invalid.

Furthermore, each of the target coordinate points has set therefor a slide determination area indicated by hatching in FIG. 11B. The slide determination area includes one of the target coordinate points. The width of the slide determination area along the x-axis direction is greater than the diameter of a target object. That is, the width of the slide determination area along the x-axis direction is greater than the width of the tap determination area along the x-axis direction.

Furthermore, the length of the tap determination area along the y-axis direction is greater than the diameter of a target object. Note that the length of the slide determination area along the y-axis direction is equal to the length of the tap determination area along the y-axis direction here. Therefore, the slide determination area has a greater area than the tap determination area. Alternatively, however, the slide determination area and the tap determination area may have mutually different lengths along the y-axis direction.

In the following, the slide determination area including the first target object 70a is considered as the first slide determination area, and the individual slide determination areas including the second target object 70b to the fifth target object 70e are considered as the n-th tap determination areas (n is an integer from two to five).

When it is identified that a hold operation or an unhold operation is performed on the touchscreen 26, it is determined which slide determination area includes the position thereof, and a lane is identified on the basis of the result of determination. Specifically, in the case where the input operation is identified as a hold operation or an unhold operation and it is determined that the position thereof is included in the first slide determination area, the first lane is identified.

Similarly, in the case where it is determined that the position of a hold operation or an unhold operation is included in the second slide determination area to the fifth slide determination area individually, the n-th lanes (n is an integer from two to five) are identified. Note that in the case where it is determined that the position of a hold operation or an unhold operation is not included in any of the slide determination areas, the operation is handled as being invalid.

As described above, when an operation is input during the rhythm game in the normal mode, the operation mode thereof is identified, and a lane is identified on the basis of the determination areas set for the individual operation modes. Then, in the case where a lane is identified, notes that are subject to determination are extracted on the basis of note extraction information provided for each lane.

Figure 12:
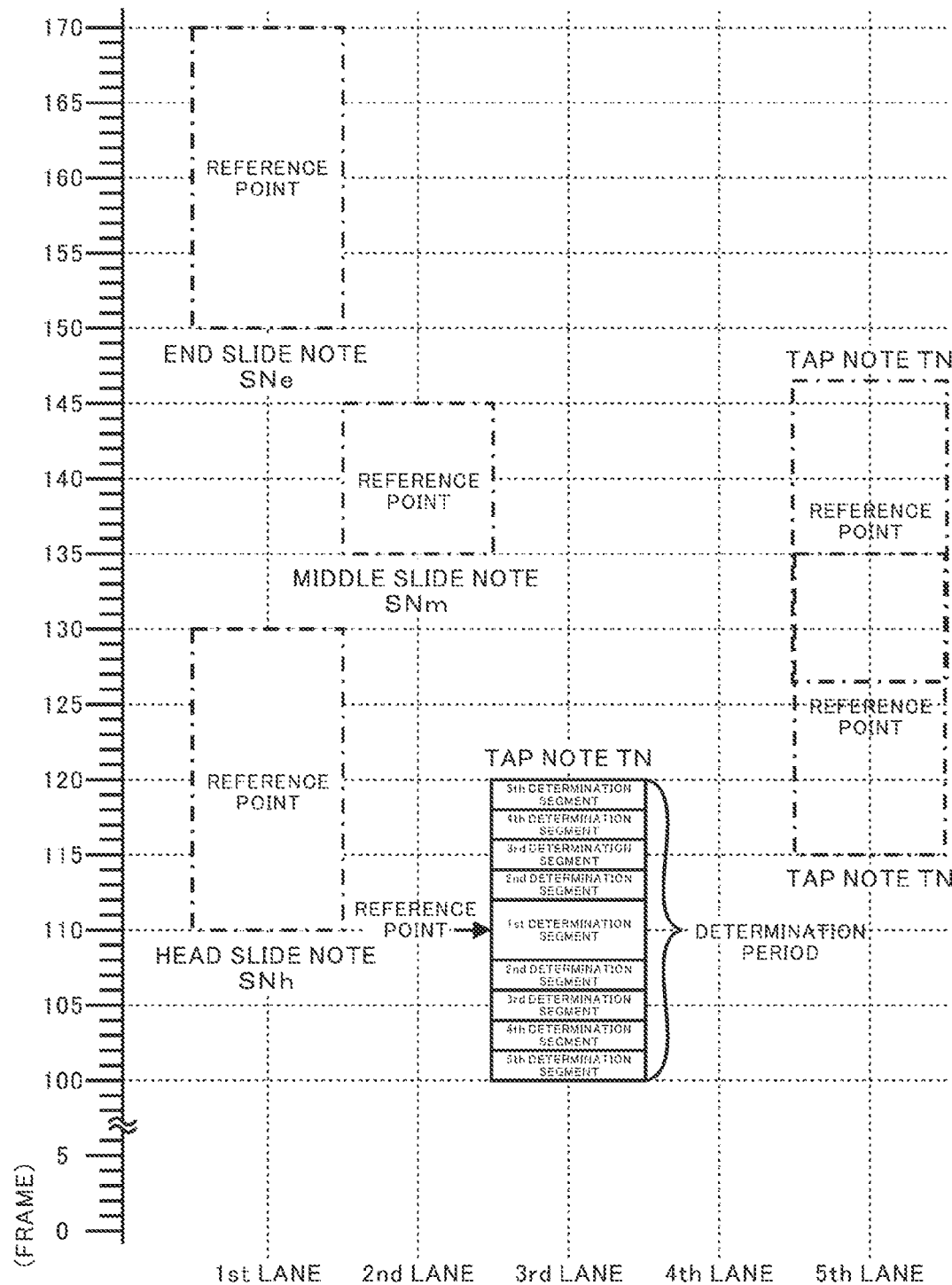
FIG. 12 is an illustration for explaining note extraction information and determination criterion information.

FIG. 12 is an illustration for explaining note extraction information and determination criterion information. When the rhythm game in the normal mode is started, note extraction information is stored in the memory 12. The note extraction information is provided for each piece of music (kind of game) in the rhythm game in the normal mode. In the note extraction information, the kinds of notes N (note information) are associated with the times elapsed since the start of the rhythm game. The note extraction information is provided for each lane.

Note that in the note extraction information, the number of frames displayed on the touchscreen 26 is set as the time elapsed. Although there is no limitation to the number of frames per unit time, i.e., the frame update interval, for example, the number of frames per second is thirty to sixty.

In the example shown in FIG. 12, in the note extraction information for the first lane, head slide note information representing a head slide note SNh is stored in frames 110 to 130. Furthermore, in the note extraction information for the first lane, end slide note information representing an end slide note SNe is stored in frames 150 to 170.

As will be described later in detail, each item of note information has a reference point set therefor. The reference point is the number of frames from the start of the rhythm game. For example, 120 frames is set as the reference point in the head slide note information for the first lane. The reference point is referred to when extracting note information, and if the reference point falls within prescribed frames with respect to the input timing of an operation, the operation is associated with the note information.

Furthermore, in the note extraction information for the second lane, middle slide note information representing a middle slide note SNm is stored in frames 135 to 145. A single slide note set SN is constituted of the head slide note SNh and the end slide note SNe in the first lane and the middle slide note SNm in the second lane.

Furthermore, in the note extraction information for the fifth lane, tap note information representing a tap note TN is stored individually in frames 115 to 135 and in frames 127 to 147. As described above, there are cases where portions of a plurality of items of note information are stored in the same frame in a multiplexed manner in a single lane.

For example, suppose that an operation performed during the rhythm game in the normal mode is identified as a tap operation and that the fifth lane is identified. In this case, the number of frames (elapsed time) since the start of the rhythm game is obtained, and among the items of note information present in the fifth lane, one earliest item of note information having the reference point within the prescribed preceding or succeeding frames is extracted with reference to the number of frames at the input timing of the operation.

Although the prescribed number of frames can be set as appropriate, here, ten frames is set as the prescribed frames. Therefore, if the reference point of one or more of the items of note information is included within ten frames preceding the current frame or ten frames succeeding the current frames, the earliest item of note information (having the least number of frames) among those items of note information is identified as a determination subject. Note that if no item of note information is present within the preceding or succeeding ten frames, the operation is considered as not corresponding to any note N, i.e., as being invalid.

When one of the items of note information is identified as a determination subject in the manner described above, then, a timing determination process is performed on the basis of determination criterion information. The determination criterion information has set therein a determination period including the reference point. Furthermore, a determination segment is derived on the basis of the difference between the reference point and the input timing of the operation.

For example, the tap note TN in the third lanes has set therefor 110 frames as the reference point. Here, ten frames preceding and succeeding the reference point, i.e., twenty frames, are set as the determination period for the tap note TN. The determination period is divided into a first determination segment to a fifth determination segment. Specifically, the first determination segment is the range within two frames preceding and succeeding the reference point, the second determination segment is the range having a difference of three or four frames from the reference point, the third determination segment is the range having a difference of five or six frames from the reference point, the fourth determination segment is the range having a difference of seven or eight frames from the reference point, and the fifth determination segment is the range having a difference of nine or ten frames from the reference point.

Note that the determination period may vary among the notes N or may be the same for all the notes N. Furthermore, the number of determination segments provided in the determination period and the numbers of frames for the individual determination segments may be the same for all the notes N or may vary among the notes N.

Here, the first determination segment to the fourth determination segment for the tap note TN are classified as successful determinations, and the fifth determination segment is classified as a failed determination. The player is awarded points in the case where the result of timing determination is a successful determination, whereas the player is not awarded points in the case where the result of determination is a failed determination. Furthermore, the player is awarded greater points as the difference between the reference point and the input timing of the operation becomes smaller. Therefore, the greatest points are awarded in the case of the result of determination for the first determination segment, and the points awarded decrease in order of the second determination segment, the third determination segment, and the fourth determination segment.

The item of note information identified as a determination subject and subjected to a timing determination process in the manner described above is deleted from the note extraction information in the memory 12. Thus, the same item of note information is not identified as a determination subject twice or more, and one item of note information is subjected to a timing determination process only once. Therefore, even in the case of a failed determination, the item of note information identified as a determination subject is deleted, and thus the same item of note information will not be extracted as a determination subject.

Although the item of note information identified as a determination subject is deleted here, alternatively, for each item of note information, information for distinguishing whether or not the item of note information has been identified as a determination subject may be kept.

(Method of Determining Operation in Rhythm Game in Special Mode)

Figure 13A:
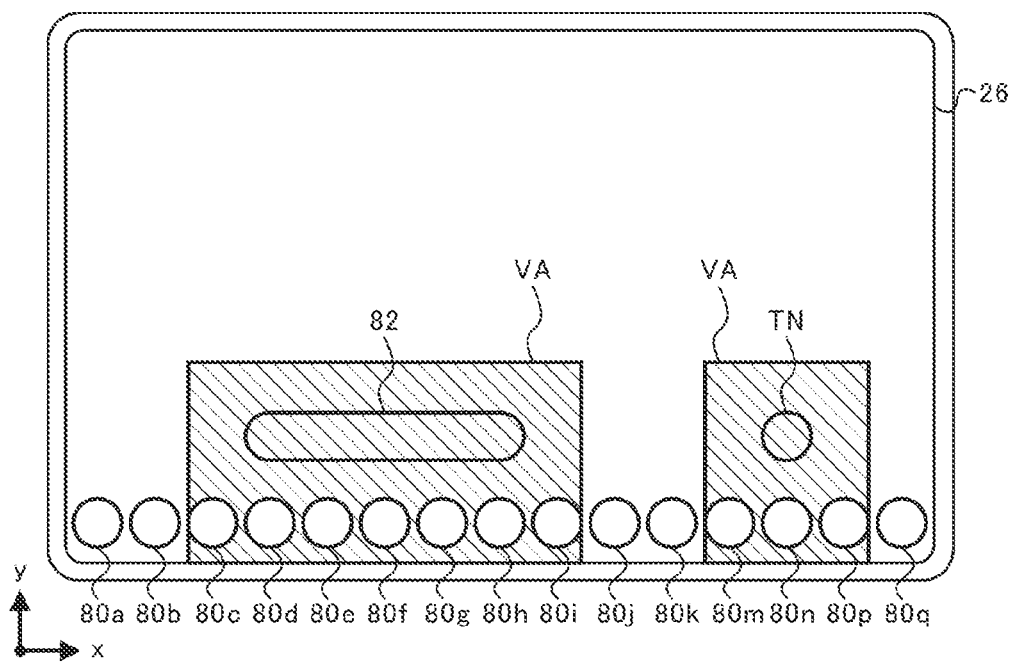
FIG. 13A is a first illustration for explaining a validity determination area.
Figure 13B:
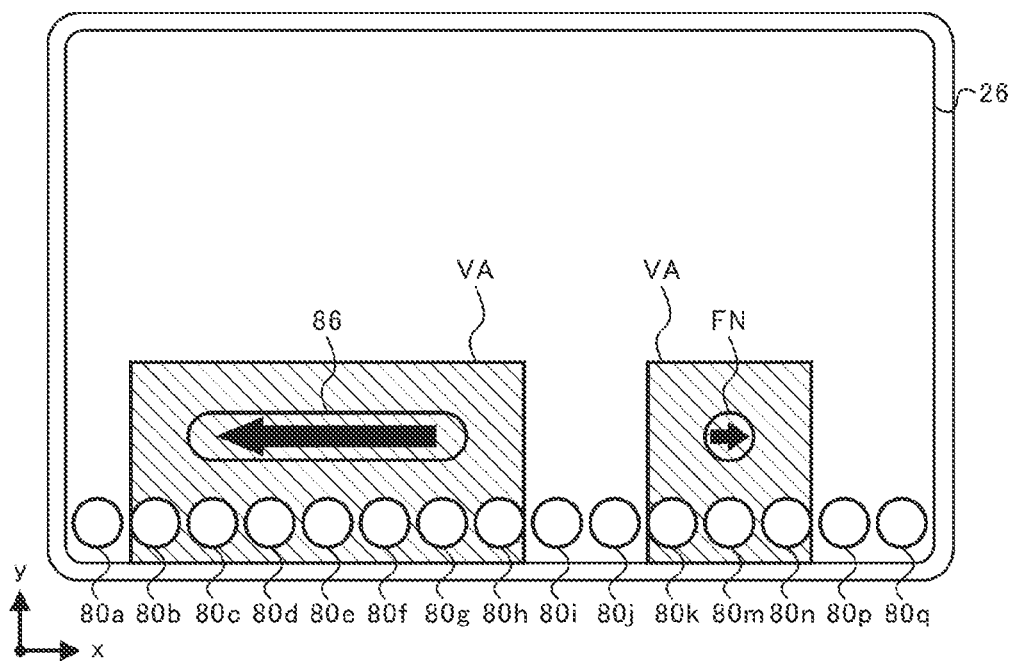
FIG. 13B is a second illustration for explaining a validity determination area.

Next, the method of determining an operation in the special mode will be described. FIG. 13A is a first illustration for explaining a validity determination area VA, and FIG. 13B is a second illustration for explaining the validity determination area VA. In the special mode, as shown in FIG. 13A, fifteen target objects, namely, the first target object 80*a* to the fifteenth target object 80*q*, are displayed on the basis of the target coordinate points. The center positions of the individual target objects serve as the fifteen target coordinate points in the special mode. Here, the target coordinate point at which the center of the first target object 80*a* is located will be referred to as the first target coordinate point, and the target coordinate points at which the centers of the second target object 80*b* to the fifteenth target object 80*q* are located will individually be referred to as the n-th target coordinate points (n is an integer from two to fifteen).

In the special mode, validity determination areas VA are set for all the notes N. In FIGS. 13A and 13B, the validity determination areas VA are indicated by hatching. The validity determination areas VA are set on the basis of the target coordinate points at which the notes N arrive. For example, the tap note TN shown in FIG. 13A is displayed so as to move and arrive at the thirteenth target coordinate point (thirteenth target object 80*n*).

The range of the validity determination area VA for the tap note TN along the y-axis direction is larger compared with the thirteenth target object 80*n*. Here, the range of the validity determination area VA along the y-axis direction is the same for all the notes N, and is equal to the ranges of the tap determination area and the slide determination area along the y-axis direction in the normal mode. Alternatively, however, the range of the validity determination area VA along the y-axis direction may vary among the notes N, and may be different from the ranges of the tap determination area and the slide determination area along the y-axis direction.

Furthermore, the range of the validity determination area VA for the tap note TN along the x-axis direction spans from the display area of the twelfth target object 80*m* to the display area of the fourteenth target object 80*p*. That is, the validity determination area VA for the tap note TN at least includes a target object corresponding to the target coordinate point at which the tap note TN arrives, a target object corresponding to the target coordinate point immediately adjacent to the target coordinate point at which the tap note TN arrives, and the area between these target objects.

Furthermore, the tap note 82 shown in FIG. 13A is a specific note that simultaneously arrive at the fourth target object 80*d* to the eighth target object 80*h*. That is, the tap note 82 has set therefor five target coordinate points, namely, the fourth target object to the eighth target object, as the arrival points thereof, and simultaneously arrives at these five target coordinate points.

The range of the validity determination area VA for the tap note 82 along the x-axis direction spans from the display area of the third target object 80*c* to the display area of the ninth target object 80*i*. That is, also with the tap note 82, the range of the validity determination area VA along the x-axis direction is set to include the display ranges of the target objects located immediately adjacent to the target objects at which the tap note 82 arrives.

Furthermore, the flick note FN shown in FIG. 13B is displayed so as to move and arrive at the twelfth target coordinate point (twelfth target object 80*m*). The range of the validity determination area VA for the flick note FN along the y-axis direction is larger compared with the twelfth target object 80*m*. Furthermore, the range of the validity determination area VA for the flick note FN along the x-axis direction spans from the display area of the eleventh target object 80*k* to the display area of the thirteenth target object 80*n*.

Furthermore, the flick note 86 shown in FIG. 13B is a specific note that arrives simultaneously at the third target object 80*c* to the seventh target object 80*g*. That is, the flick note 86 has set therefor five target coordinate points, namely, the third target coordinate point to the seventh target coordinate point, as the arrival points thereof, and simultaneously arrives at these five target coordinate points.

The range of the validity determination area VA for the flick note 86 along the x-axis direction spans from the display area of the second target object 80*b* to the display area of the eighth target object 80*h*. That is, also with the flick note 86, the range of the validity determination area VA along the x-axis direction is set to include the display ranges of the target objects located immediately adjacent to the target objects at which the flick note 86 arrives.

In the special mode, the width of the flick note 86 along the x-axis direction varies. That is, in the special mode, the movement distance of a flick operation to be input varies depending on the width of the flick note 86, in other words, the number of target coordinate points that the flick note 86 is associated with.

As described above, the validity determination area VA for a specific note at least includes a plurality of target objects corresponding to the target coordinate points at which the specific note arrives, as well as the area between the plurality of target objects. Furthermore, in this embodiment, the validity determination area VA for a specific note at least includes target objects corresponding to the target coordinate points at which the specific note arrives, target objects corresponding to the target coordinate points immediately adjacent to the target coordinate points at which the specific note arrives, and the areas between these target objects. Therefore, it can be said that the validity determination area VA is an area at least including the line segment joining, along the shortest distance, the set of target coordinate points corresponding to the specific note.

Here, the validity determination area VA is set on the basis of the corresponding area. The corresponding area is set for each target coordinate point. Here, with respect to a target coordinate point at the center, the corresponding area at least includes the midpoint between the target coordinate point and the target coordinate point located immediately adjacent thereto. In this embodiment, since adjacent target objects are spaced from each other, the center position of the gap between adjacent target objects serves as the boundary between corresponding areas. Therefore, the corresponding area is larger than the target object. By connecting corresponding areas set for the individual target coordinate points, the validity determination areas VA are set without forming gaps along the x-axis direction.

Figure 14:
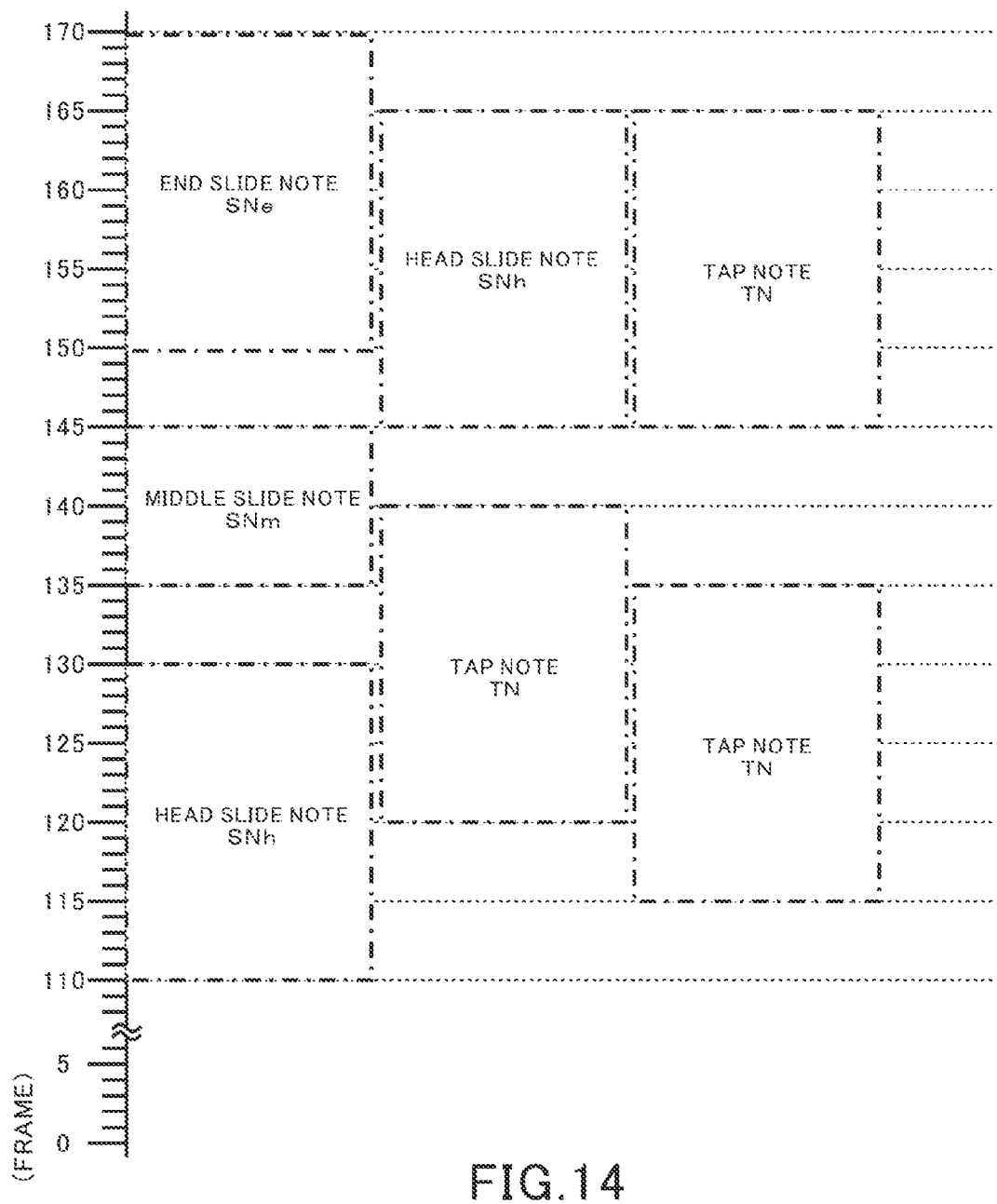
FIG. 14 is an illustration for explaining subject-note extraction information.

FIG. 14 is an illustration for explaining subject-note extraction information. When the rhythm game in the special mode is started, subject-note extraction information is stored in the memory 12. The subject-note extraction information is provided for each piece of music (kind of game) in the rhythm game in the special mode. In the subject-note extraction information, the time elapsed (the number of frames) since the start of the rhythm game is associated with the kinds of notes N (note information). With the subject-note extraction information, there are also cases where a plurality of items of note information is associated with one number of frames, as shown in FIG. 14.

Furthermore, when the rhythm game in the special mode is started, the determination criterion information described earlier and validity determination area information are stored in the memory 12. The validity determination area information is provided for each item of subject-note extraction information, and all the validity determination areas VA of all the items of note information included in the subject-note extraction information are stored.

When a tap operation is input during the rhythm game in the special mode, the earliest item of note information having the reference point within the prescribed preceding or succeeding frames is extracted with reference to the current frame on the basis of the subject-note extraction information. At this time, the tap operation is considered as being invalid if no item of note information is extracted.

Meanwhile, suppose that an item of note information is extracted and that the extracted item of note information is tap note information or head slide note information corresponding to a tap operation. In this case, it is determined whether or not the operation position of the tap operation falls within the validity determination area VA of the item of note information. If the operation position falls within the validity determination area VA, the item of note information is identified as a determination subject, and a timing determination process is executed similarly to the above. In the timing determination process, similarly to the normal mode, one of the first determination segment to the fifth determination segment is derived as the result of determination.

Meanwhile, in the case where it is determined that the extracted item of note information corresponds to the tap operation but the operation position of the tap operation does not fall within the validity determination area VA of the item of note information, the next item of note information is extracted. That is, on the basis of the subject-note extraction information, the item of note information having the reference point within the prescribed preceding or succeeding frames and displayed second (the item of note information next to the earliest item of note information extracted earlier) is extracted.

Furthermore, also in the case where the extracted item of note information does not correspond to the tap operation, specifically, in the case where the extracted item of note information is middle slide note information, end slide note information, or flick note information, the item of note information having the reference point within the prescribed preceding or succeeding frames and displayed second is extracted on the basis of the subject-note extraction information.

If the second item of note information corresponds to the tap operation and the operation position of the tap operation falls within the validity determination area VA for the item of note information, the second item of note information is identified as a determination subject. If the second item of note information is not identified as a determination subject, the processing described above is repeated subsequently until an item of note information is identified as a determination subject. At this time, the tap operation is handled as being invalid in the case where none of the items of note information is identified as a determination subject.

FIG. 15A is a first diagram for explaining an operation-information storage unit, and FIG. 15B is a second diagram for explaining an operation-information storage unit. In the memory 12, an operation-information storage unit for storing operation information is provided. Here, as the operation information, operation position information and determination subject information are stored. In the operation-information storage unit, four storage areas, namely, a first storage area to a fourth storage area, are provided. In each of the storage areas, operation information concerning an operation input to the touchscreen 26 is stored. Here, since four storage areas are provided, it is possible to simultaneously accept operations performed at four different points. Note that the number of storage areas is not limited to four, and the number of storage areas may be one or a plurality other than four.

Each of the storage areas is further divided into ten operation-position-information storage unit and one determination-subject-information storage unit. Determination as to whether an operation is being input to the touchscreen 26, i.e., input determination processing for identifying an operation on the touchscreen 26, is executed every frame, and operation-position information is stored in the individual operation-position-information storage units when the input of an operation is detected. That is, the operation-position-information storage units are updated every frame. Since ten operation-position-information storage units are provided in each of the storage areas, for example, in the case where a hold operation is being input, operation position information (x coordinate, y coordinate) of the operation as detected in the immediately preceding ten frames is stored for the hold operation. In FIGS. 15A and 15B, 0 F indicates the current frame, and −1 F to −9 F indicate one frame before to nine frames before. Furthermore, the operation-information storage unit in FIG. 15B shows the state in which the operation-information storage unit in FIG. 15A has been updated in the next frame.

For example, suppose that operation information is stored in the first storage area and the third storage area in the operation-information storage unit and that operation information is not stored in the second storage unit and the fourth storage unit, as shown in FIG. 15A. The example shown in the first storage area in FIG. 15A indicates that an operation (hold operation) is continuously being input from at least nine frame before to the current frame. Furthermore, the example shown in the third storage area in FIG. 15A indicates that an operation (hold operation) is continuously being input from four frames before to the current frame.

In the input determination processing, the operation-position information stored in the operation-position-information storage unit corresponding to nine frames before is deleted. Then, as shown in the first storage areas in FIGS. 15A and 15B, the individual items of operation position information stored in the individual operation-position-information storage units corresponding to the zeroth frame to eight frames before are individually shifted to the operation-position-information storage units corresponding to one frame before to nine frames before.

Then, whether or not an operational input is being performed on the touchscreen 26 is detected, and in the case where an operational input is being performed, the operation position information (x coordinate and y coordinate) thereof is obtained. In the case where operations are simultaneously performed at different positions, a plurality of items of operation position information are obtained. At this time, the obtained operation position information is compared with the operation position information shifted to the operation-position-information storage unit corresponding to one frame before. Then, if there is no operation position information with which the difference from the obtained operation position information falls within a prescribed range, an item of note information that serves as a determination subject is extracted on the basis of the subject-note extraction information in the manner described above.

Then, in the case where an item of note information that serves as a determination subject is identified, a timing determination process is executed. At this time, as shown in FIG. 15B, new operation position information is stored in the operation-position-information storage unit corresponding to the zeroth frame among blank storage areas (the second storage area here). Furthermore, the item of note information identified as a determination subject is stored in the determination-subject-information storage unit. Note that in the case where the item of note information serving as a determination subject is a head slide note SNh, a middle slide note SNm, or an end slide note SNe, information identifying a slide note set SN including the item of note information is stored as the determination subject information.

Note that in the case where a new operation is input but no item of note information that serve as a determination subject is identified, operation information corresponding to the operation is not stored in the operation-information storage unit.

Suppose further that the difference between the obtained operation position information and the operation position information shifted to the operation-position-information storage unit corresponding to one frame before falls within the prescribed range. In this case, the operation position information is stored in the operation-position-information storage unit corresponding to the zeroth frame in the same storage area as the compared operation position information.

For example, suppose that the operation position information is stored in the first storage area in the operation-information storage unit as shown in FIG. 15A. In this case, in the next frame, the individual items of operation position information stored in the operation-position-information storage units for the zeroth frame to eight frames before in FIG. 15A are shifted to the operation-position-information storage units for one frame before to nine frames before, as shown in FIG. 15B.

Then, the operation position information with which the difference from the operation position information of one frame before in the first storage area falls within the prescribed range is stored in the operation-position-information storage unit corresponding to the zeroth frame in the first storage area. As described above, it is identified that a hold operation is being performed on the basis of uninterrupted successive storage of operation position information in a single storage area.

As another example, suppose that the operation position information in the third storage area is shifted, as shown in FIGS. 15A and 15B. At this time, in the case where no operation position information with which the difference from the operation position information of one frame before in the third storage area falls within the prescribed range is obtained, new operation position information is not stored in the operation-position-information storage unit corresponding to the zeroth frame in the third storage area.

As described above, it is identified that a hold operation is finished, i.e., an unhold operation is performed, on the basis of the storage of operation position information in the operation-position-information storage unit corresponding to one frame before and the no storage of operation position information in the operation-position-information storage unit corresponding to the zeroth frame. In this case, all the operation position information and determination subject information stored in the third storage area is deleted.

In the case where it is identified that a hold operation or an unhold operation is performed in the manner described above, it is determined whether or not the current timing falls within the determination period for the item of note information stored in the determination-subject-information storage unit and whether or not the operation position falls within the validity determination area VA. At this time, similarly to the above, a timing determination process is performed if the current timing falls within the determination period and the operation position falls within the validity determination area VA.

(Specific Control Processes at Player Terminal 1)

Figure 16:
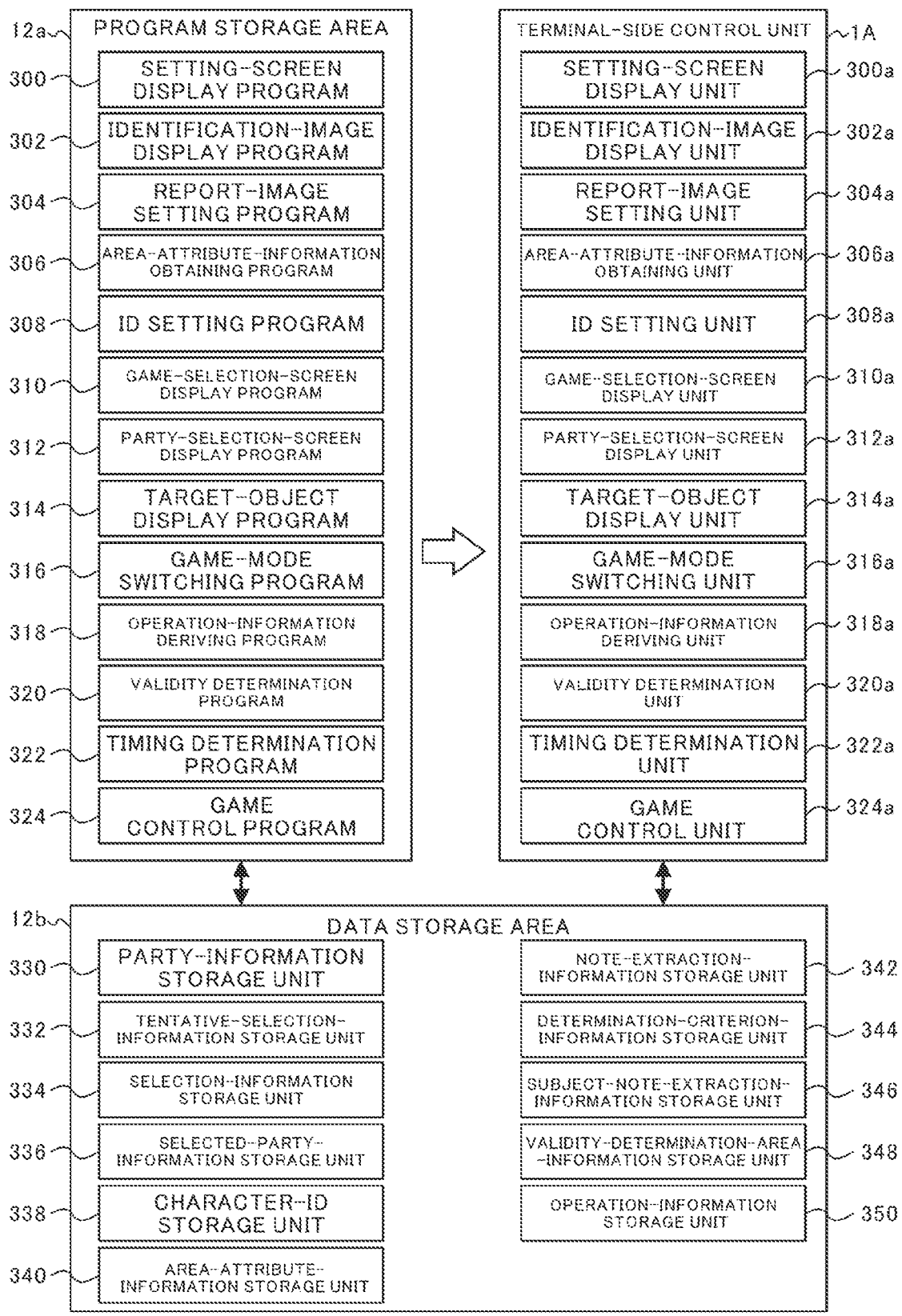
FIG. 16 is a diagram for explaining the configuration of a memory at the player terminal, as well as functions thereof as a computer.

Next, specific control processes at the player terminal 1 for executing the above-described game will be described. FIG. 16 is a diagram for explaining the configuration of the memory 12 at the player terminal 1, as well as functions thereof as a computer. In the memory 12, a program storage area 12a and a data storage area 12b are provided. Upon the activation of an application, the CPU 10 stores terminal-side control programs (modules) in the program storage area 12a.

The terminal-side control programs include a setting-screen display program 300, an identification-image display program 302, a report-image setting program 304, an area-attribute-information obtaining program 306, an ID setting program 308, a game-selection-screen display program 310, a party-selection-screen display program 312, a target-object display program 314, a game-mode switching program 316, an operation-information deriving program 318, a validity determination program 320, a timing determination program 322, and a game control program 324. Note that the programs mentioned above are examples, and a large number of other programs are also provided in the program storage area 12a.

In the data storage area 12b, as storage units for storing data, a party-information storage unit 330, a tentative-selection-information storage unit 332, a selection-information storage unit 334, a selected-party-information storage unit 336, a character-ID storage unit 338, an area-attribute-information storage unit 340, a note-extraction-information storage unit 342, a determination-criterion-information storage unit 344, a subject-note-extraction-information storage unit 346, a validity-determination-area-information storage unit 348, and an operation-information storage unit 350 are provided. Note that the storage units mentioned above are examples, and a large number of other storage units are also provided in the data storage area 12b.

The CPU 10 runs the individual programs stored in the program storage area 12a to update the data in the individual storage units in the data storage area 12b. Then, by running the individual programs stored in the program storage area 12a, the CPU 10 causes the player terminal 1 (computer) to function as a terminal-side control unit 1A. The terminal-side control unit 1A includes a setting-screen display unit 300a, an identification-image display unit 302a, a report-image setting unit 304a (reporting unit), an area-attribute-information obtaining unit 306a (obtaining unit), an ID setting unit 308a, a game-selection-screen display unit 310a, a party-selection-screen display unit 312a (selection-screen display unit), a target-object display unit 314a, a game-mode switching unit 316a, an operation-information deriving unit 318a, a validity determination unit 320a, a timing determination unit 322a, and a game control unit 324a.

Specifically, the CPU 10 runs the setting-screen display program 300, thereby causing the computer to function as the setting-screen display unit 300a. Similarly, the CPU 10 runs the identification-image display program 302, the report-image setting program 304, the area-attribute-information obtaining program 306, the ID setting program 308, the game-selection-screen display program 310, the party-selection-screen display program 312, the target-object display program 314, the game-mode switching program 316, the operation-information deriving program 318, the validity determination program 320, the timing determination program 322, and the game control program 324, thereby causing the computer to function as the setting-screen display unit 300a, the identification-image display unit 302a, the report-image setting unit 304a, the area-attribute-information obtaining unit 306a, the ID setting unit 308a, the game-selection-screen display unit 310a, the party-selection-screen display unit 312a, the target-object display unit 314a, the game-mode switching unit 316a, the operation-information deriving unit 318a, the validity determination unit 320a, the timing determination unit 322a, and the game control unit 324a, respectively. The following describes some of the processes that are executed by the terminal-side control unit 1A. The individual processes described below are executed repeatedly at frame (image) updating intervals.

Figure 17:
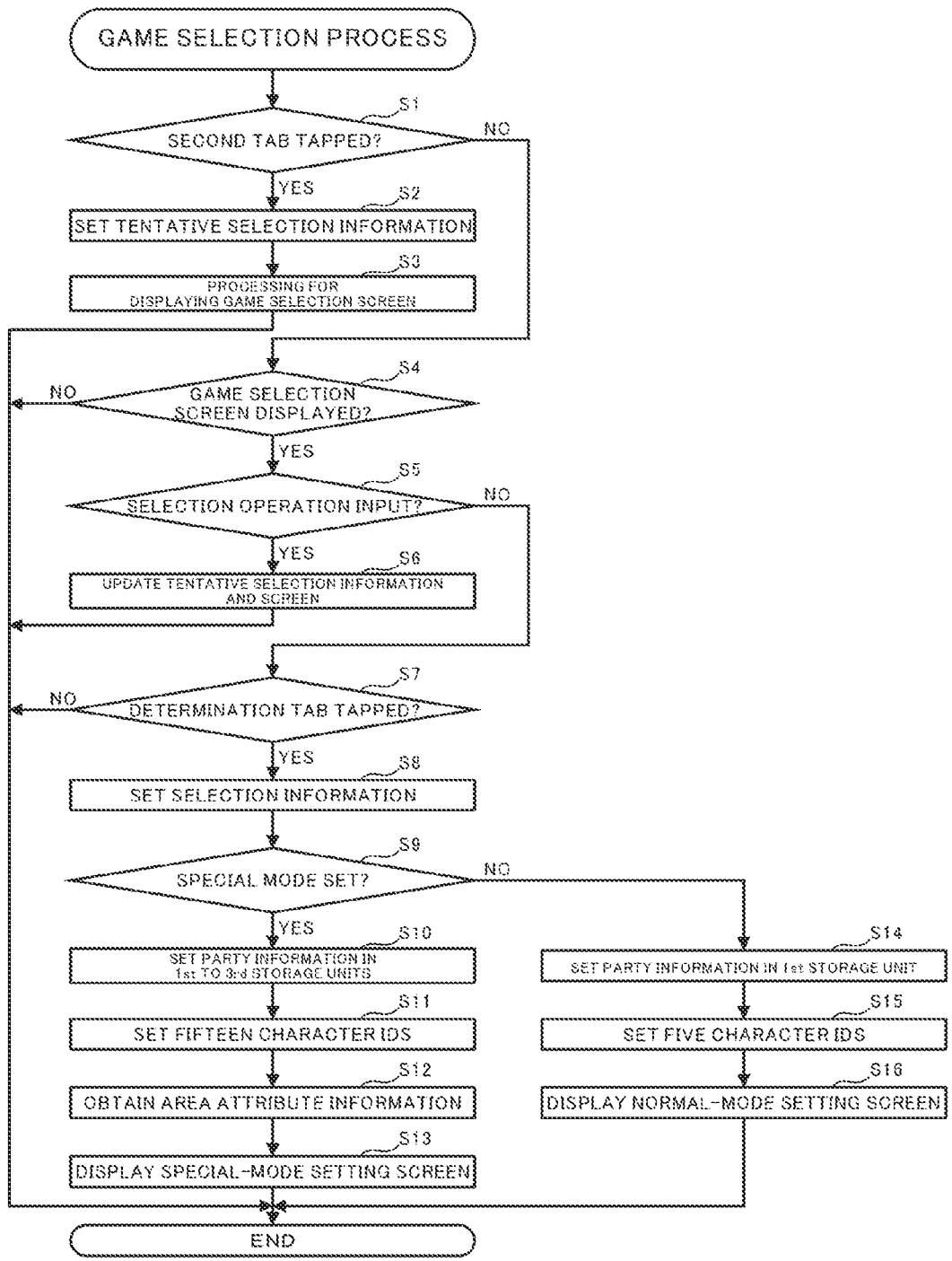
FIG. 17 is a flowchart for explaining an example game selection process at the player terminal.

FIG. 17 is a flowchart for explaining an example game selection process at the player terminal 1. When the second tab 30b is tapped (YES in S1), the game-selection-screen display unit 310a sets tentative selection information in the tentative-selection-information storage unit 332 (S2). Here, information indicating the kind of game (piece of music) and information indicating the game mode are set as the tentative selection information.

Furthermore, the game-selection-screen display unit 310a displays a game selection screen (FIG. 4A or FIG. 4B) on the touchscreen 26 on the basis of the tentative selection information set in the tentative-selection-information storage unit 332 (S3).

Furthermore, when a selection operation is input (YES in S5) while the game selection screen is displayed (YES in S4), the game-selection-screen display unit 310a updates the tentative selection information in the tentative-selection-information storage unit 332 on the basis of the selection operation, and updates the displaying of the game selection screen on the basis of the updated tentative selection information (S6).

Furthermore, in the case where the normal-mode selection tab 42a is tapped as the selection operation, the game-mode switching unit 316a updates the tentative selection information indicating the game mode to information corresponding to the normal mode, whereby the normal-mode selection tab 42a is displayed in a highlighted manner. Similarly, in the case where the special-mode selection tab 42b is tapped, the game-mode switching unit 316a updates the tentative selection information indicating the game mode to information corresponding to the special mode, whereby the special-mode selection tab 42b is displayed in a highlighted manner.

As another example, in the case where a flick operation is performed in the up/down direction on the piece-of-music information tab 40a or one of the title display tabs 40b as the selection operation, the game-selection-screen display unit 310a updates information indicating the kind of game.

Furthermore, when the determination tab 44 in the game selection screen is tapped (YES in S7), the setting-screen display unit 300a sets selection information corresponding to the tentative selection information stored in the tentatively-selected-information storage unit 332 in the selection-information storage unit 334 (S8). When selection information corresponding to the special mode is set in the selection-information storage unit 334 (YES in S9), the setting-screen display unit 300a selects three items of party information according to a prescribed condition from the seven items of party information stored in the party-information storage unit 330, and sets the three items of party information in the first storage unit to the third storage unit in the selected-party-information storage unit 336 (see FIG. 7B) (S10).

Furthermore, on the basis of the party information set in the selected-party-information storage unit 336 in S10 and the party information stored in the party-information storage unit 330, the ID setting unit 308a sets character IDs individually in the first storage area to the fifteenth storage area in the character-ID storage unit 338 (see FIG. 7C) (S11).

Furthermore, the area-attribute-information obtaining unit 306a obtains the area attribute information corresponding to the kind of game (piece of music) set in the selection-information storage unit 334 in S8 among the area attribute information stored in the memory 12, and sets the obtained area attribute information in the area-attribute-information storage unit 340 (S12).

Then, the setting-screen display unit 300a displays a special-mode setting screen (see FIG. 6A) on the basis of the information set in S8, S10, and S11 (S13). Furthermore, in S13, the identification-image display unit 302a displays identification images 58 in setting areas on the basis of the party information set in the selected-party-information storage unit 336 in S10. Furthermore, in S13, the report-image setting unit 304a displays report images 60 in setting areas on the basis of the area attribute information set in the area-attribute-information storage unit 340 in S12.

Meanwhile, when selection information corresponding to the normal mode is set in the selection-information storage unit 334 (NO in S9), the setting-screen display unit 300a selects one item of party information according to a prescribed condition from the seven items of party information stored in the party-information storage unit 330, and sets the one item of party information in the first storage unit in the selected-party-information storage unit 336 (see FIG. 7B) (S14).

Furthermore, on the basis of the party information set in the selected-party-information storage unit 336 in S14 and the party information stored in the party-information storage unit 330, the ID setting unit 308a sets character IDs individually in the first storage area to the fifth storage area in the character-ID storage unit 338 (S15).

Then, the setting-screen display unit 300a displays a normal-mode setting screen (see FIG. 5) on the basis of the information set in S8, S14, and S15 (S16). Furthermore, in S16, the identification-image display unit 302a displays identification images 58 in setting areas on the basis of the party information set in the selected-party-information storage unit 336 in S14.

Figure 18:
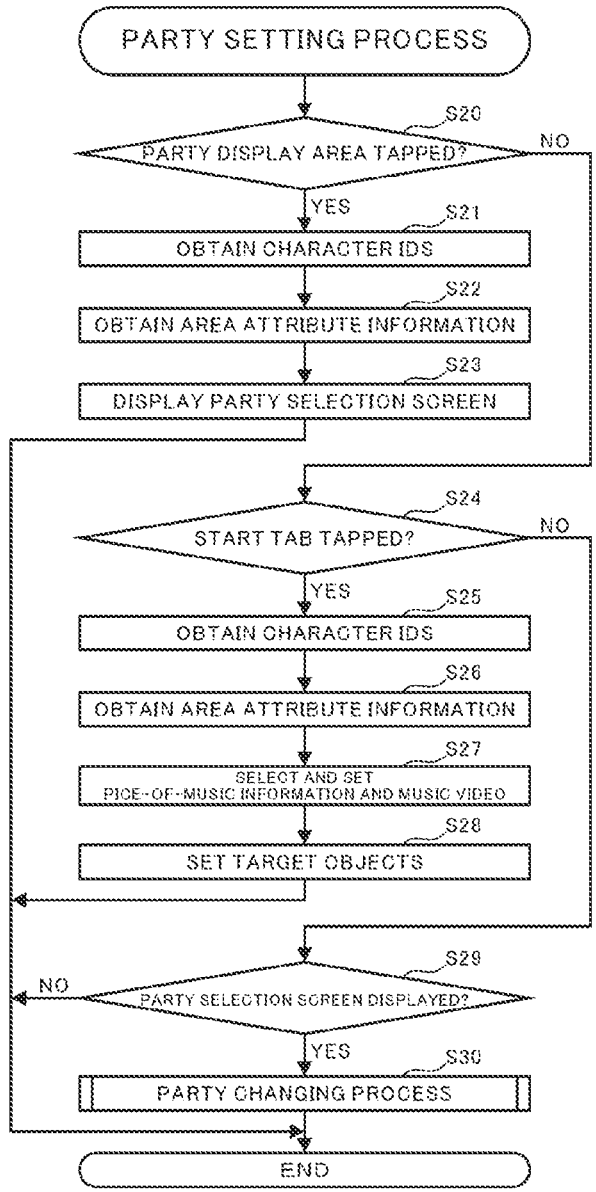
FIG. 18 is a flowchart for explaining an example party setting process at the player terminal.

FIG. 18 is a flowchart for explaining an example party setting process at the player terminal 1. The party setting process is started when the special-mode setting screen is displayed in the game selection process described above, and is executed repeatedly while the special-mode setting screen or the party selection screen is displayed.

When one of the left party display area 52, the middle party display area 54, and the right party display area 56 is tapped in the special-mode setting screen (YES in S20), the party-selection-screen display unit 312a obtains the character IDs stored in the character-ID storage unit 338 (S21). Furthermore, the area-attribute-information obtaining unit 306a obtains the area attribute information stored in the area-attribute-information storage unit 340 (S22). The partyselection-screen display unit 312a displays a party selection screen (see FIG. 6C) on the basis of the information obtained in S21 and S22 (S23).

Furthermore, in S23, on the basis of the information obtained in S21 and S22, the identification-image display unit 302a displays identification images 58 in selection areas, the report-image setting unit 304a displays report images 60 in the selection screen, thereby reporting the identification images 58 displayed in object display areas.

Furthermore, when the start tab 50 is tapped in the special-mode setting screen (YES in S24), the game control unit 324a obtains the character IDs stored in the character-ID storage unit 338 (S25). Furthermore, the area-attribute-information obtaining unit 306a obtains the area attribute information stored in the area-attribute-information storage unit 340 (S26).

Furthermore, on the basis of the information obtained in S25 and S26, the game control unit 324a sets game data associated with the kind of game (piece of music) set in the selection-information storage unit 334 (S27). Here, music video data, control data for displaying notes N so as to move on the touchscreen 26, and audio data are set as the game data.

Note that in S27, music video data corresponding to the kind of game and corresponding to the combination of the character IDs set in the object display areas is set. Furthermore, the target-object display unit 314a sets identification images 58 serving as target objects at the target coordinate points on the basis of the character IDs stored in the character-ID storage unit 338 (S28). Thus, the target objects (identification images 58) corresponding to the target coordinate points are displayed on the touchscreen 26.

Furthermore, while the party selection screen is displayed (YES in S29), the party-selection-screen display unit 312a executes a party changing process (S30).

Figure 19:
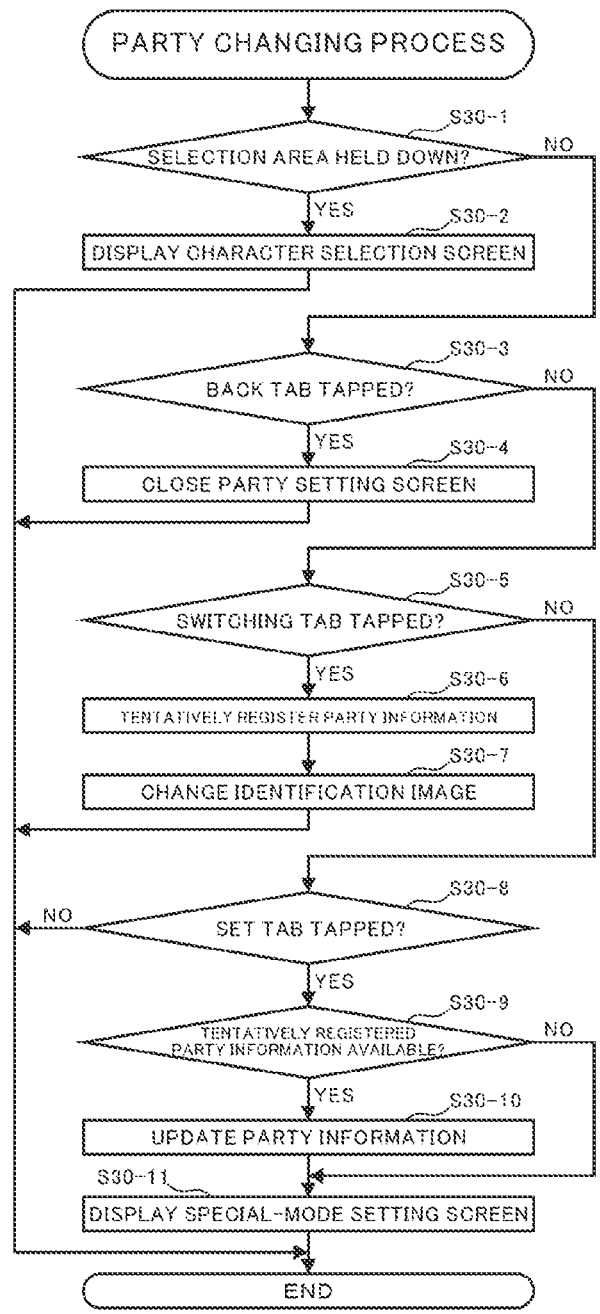
FIG. 19 is a flowchart for explaining an example party changing process at the player terminal.

FIG. 19 is a flowchart for explaining an example party changing process (S30) at the player terminal 1. The party changing process is executed after a party selection screen is displayed in S23. When one of the selection areas is held down in the party selection screen (YES in S30-1), the party-selection-screen display unit 312a displays a character selection screen (S30-2).

Although not described in detail, when characters are changed in the character selection screen, character information before the change is updated to character information after the change in the party-information storage unit 330. Similarly, character IDs before the change are updated to character IDs after the change in the character-ID storage unit 338. When the character change is finished in the character selection screen, the party selection screen is displayed again.

When the back tab 66 is tapped in the party selection screen (YES in S30-3), the party-selection-screen display unit 312a terminates the displaying of the party selection screen, and the setting-screen display unit 300a displays a special-mode setting screen (S30-4).

When one of the switching tabs 48 is tapped in the party selection screen (YES in S30-5), the party-selection-screen display unit 312a tentatively registers party information that is different from the party information stored in the selected-party-information storage unit 336 among the party information stored in the party-information storage unit 330 (S30-6). Furthermore, the identification-image display unit 302a displays (changes) identification images 58 in the selection areas on the basis of the party information tentatively registered in S30-6 (S30-7).

When the set tab 64 is tapped in the party selection screen (YES in S30-8), if tentatively registered party information is available (YES in S30-9), the party-selection-screen display unit 312a sets the tentatively registered party information in the selected-party-information storage unit 336 (S30-10).

Furthermore, the party-selection-screen display unit 312a terminates the displaying of the party selection screen, and the setting-screen display unit 300a displays a special-mode setting screen (S30-11). At this time, the identification-image display unit 302a displays identification images 58 in setting areas on the basis of the party information selected in the party selection screen, i.e., the party information set in the selected-party-information storage unit 336.

Figure 20:
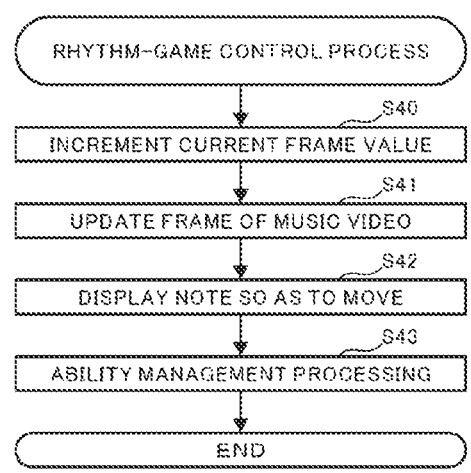
FIG. 20 is a flowchart for explaining an example rhythm-game control process at the player terminal.

FIG. 20 is a flowchart for explaining an example rhythm-game control process at the player terminal 1. The rhythm-game control process is executed from the start to the end of the rhythm game. The game control unit 324a increments the current frame value (S40). Then, the image of the music video displayed on the touchscreen 26 is updated to the image corresponding to the updated frame value (S41). Furthermore, the game control unit 324a displays notes N so as to move on the basis of control data set at the start of the rhythm game (S42).

Furthermore, the game control unit 324a manages the abilities of the individual characters used in the rhythm game (S43). As described earlier, each character has set therefor a "center effect" and a "special technique" as the abilities thereof. The game control unit 324a performs lotteries or the like for invoking these abilities. For example, suppose that a prescribed character has set therefor a "special technique" with which "a lottery for increasing points by 10% is performed every four seconds".

In this case, in the rhythm game in the normal mode, the game control unit 324a performs a lottery every four seconds, and in the case where the lottery is won, acquired points are increased by 10% over a certain subsequent time. Meanwhile, in the special mode, since three times as many characters are used as in the normal mode, with the same "special technique", for example, a lottery is performed every twelve seconds. That is, as such, the processing that is executed varies between the individual game modes. At this time, the timing at which the ability is invoked for the first time after the start of the rhythm game varies among the three parties. Thus, control is executed so as to avoid the situation in which the ability is invoked simultaneously and then the ability is not invoked for a long time. Note that also with the "center effect", similarly to the "special technique", control may be executed so that the probability of invocation, the effect of invocation, etc. by a single character becomes substantially one third in the special mode compared with the normal mode.

As described above, the game control unit 324a controls the proceeding of the game by using the character IDs corresponding to the identification images 58 displayed in the setting areas, and while the game proceeds, displays a music video in which prescribed characters appear on the basis of the character IDs corresponding to the identification images 58 displayed in the object display areas. Furthermore, the game control unit 324a functions as an object display unit that displays notes N so as to move.

Figure 21:
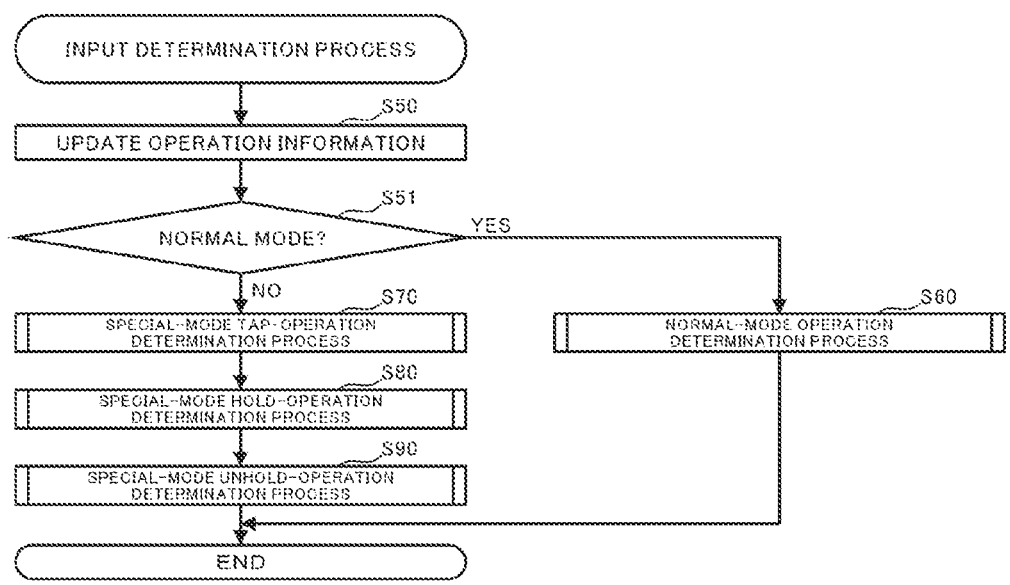
FIG. 21 is a flowchart for explaining an example input determination process at the player terminal.

FIG. 21 is a flowchart for explaining an example input determination process at the player terminal 1. The input determination process is executed from the start to the end of the rhythm game. The operation-information deriving unit 318a detects an operation on the touchscreen 26, and updates (derives) operation information in the operation-information storage unit on the basis of the result of detection (S50). Furthermore, here, the operation-information deriving unit 318a identifies whether a tap operation, a hold operation, or an uphold operation is performed.

Then, the game control unit 324a executes a normal-mode operation determination process (S60) if the game mode of the rhythm game being executed is the normal mode (YES in S51). Furthermore, the game control unit 324a executes a special-mode tap-operation determination process (S70), a special-mode hold-operation determination process (S80), and a special-mode uphold-operation determination process (S90) in order if the game mode of the rhythm game being executed is the special mode (NO in S51).

Figure 22:
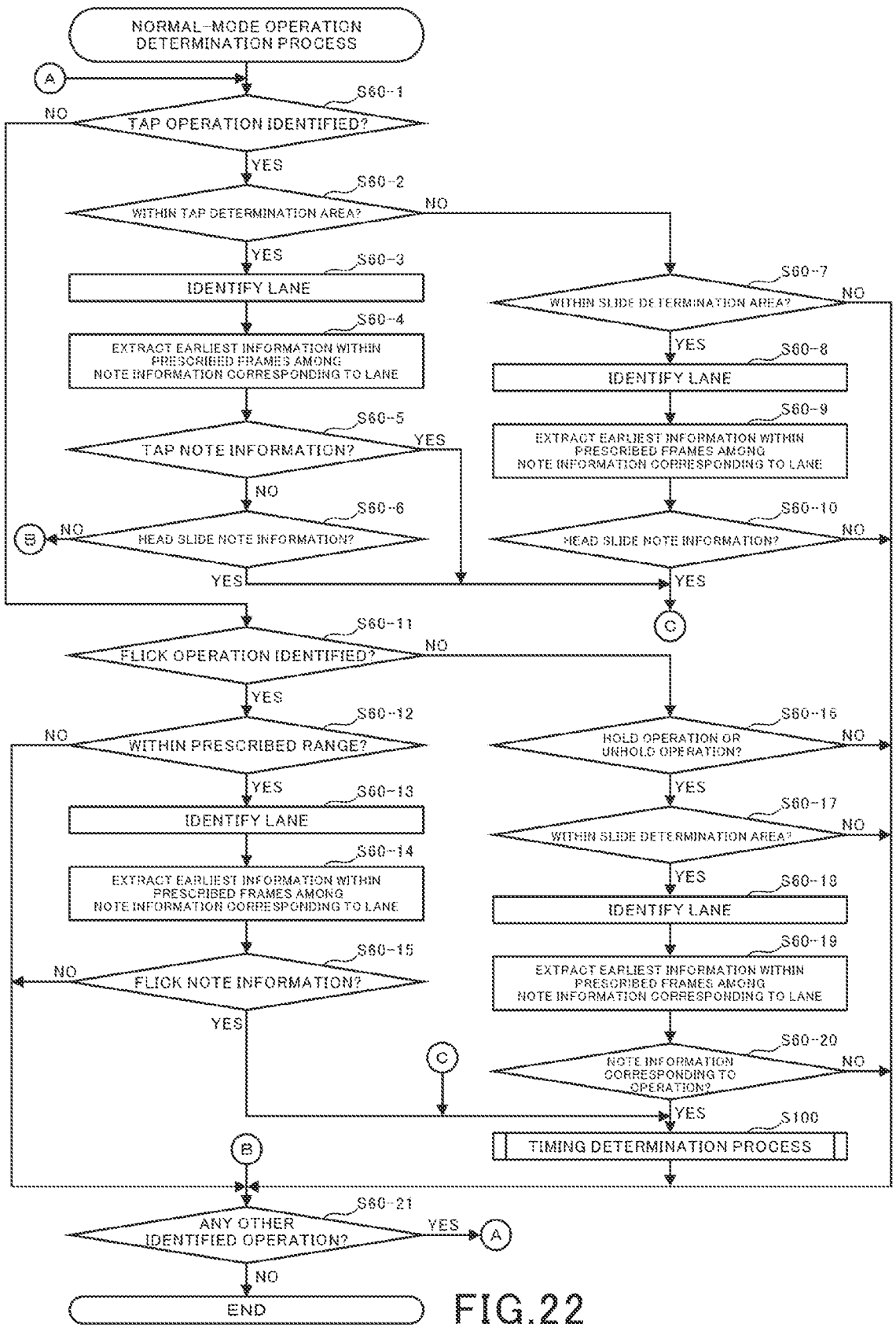
FIG. 22 is a flowchart for explaining an example normal-mode operation determination process at the player terminal.

FIG. 22 is a flowchart for explaining an example normal-mode operation determination process (S60) at the player terminal 1. In the case where it is identified in S50 that a tap operation is detected (YES in S60-1), the game control unit 324a determines whether or not the operation position of the tap operation falls within the tap determination area (S60-2). If the operation position of the tap operation falls within the tap determination area (YES in S60-2), the game control unit 324a identifies a lane (S60-3).

Furthermore, the game control unit 324a extracts the earliest item of note information having the reference point within the prescribed frames among the items of note information corresponding to the lane on the basis of the note extraction information stored in the note-extraction-information storage unit 342 (560-4). If the note information extracted at this time is tap note information or head slide note information (YES in S60-5 or YES in S60-6), the timing determination unit 322a executes a timing determination process (S100). The timing determination process will be described later in detail.

Furthermore, in the case where no note information is extracted in S60-4 or in the case where the extracted note information is neither tap note information nor head slide note information (NO in S60-6), the operation is handled as being invalid. Then, the process is repeated from S60-1 if there is any other identified operation (YES in S60-21), and the normal-mode operation determination process is terminated if there is no other identified operation (NO in S60-21).

Furthermore, if it is identified in S50 that a tap operation is detected (YES in S60-1), if the operation position of the tap operation does not fall within the tap determination area (NO in S60-2) but falls within the slide determination area (YES in S60-7), the game control unit 324a identifies a lane (S60-8).

Then, the game control unit 324a extracts the earliest item of note information having the reference point within the prescribed frames among the items of note information corresponding to the lane on the basis of the note extraction information stored in the note-extraction-information storage unit 342 (S60-9). If the note information extracted at this time is head slide note information (YES in S60-10), the timing determination unit 322a executes a timing determination process (S100).

Furthermore, if it is identified in S50 that a flick operation is detected (YES in S60-11), and if the operation position of the flick operation falls within a prescribed range (YES in S60-12), the game control unit 324a identifies a lane (S60-13). Then, the game control unit 324a extracts the earliest item of note information having the reference point within the prescribed frames on the basis of the note extraction information stored in the note-extraction-information storage unit 342 (S60-14). If the note information extracted at this time is flick note information (YES in S60-15), the timing determination unit 322a executes a timing determination process (S100).

Furthermore, if it is identified in S50 that a hold operation or an uphold operation is detected (YES in S60-16), and if the operation position falls within the slide determination area (YES in S60-17), the game control unit 324a identifies a lane (S60-18). Furthermore, the game control unit 324a extracts the earliest item of note information having the reference point within the prescribed frames on the basis of the note extraction information stored in the note-extraction-information storage unit 342 (S60-19).

At this time, if the identified operation is a hold operation and the extracted note information is middle slide note information, or if the identified operation is an uphold operation and the extracted note information is end slide note information (YES in S60-20), the timing determination unit 322a executes a timing determination process (S100).

Figure 23:
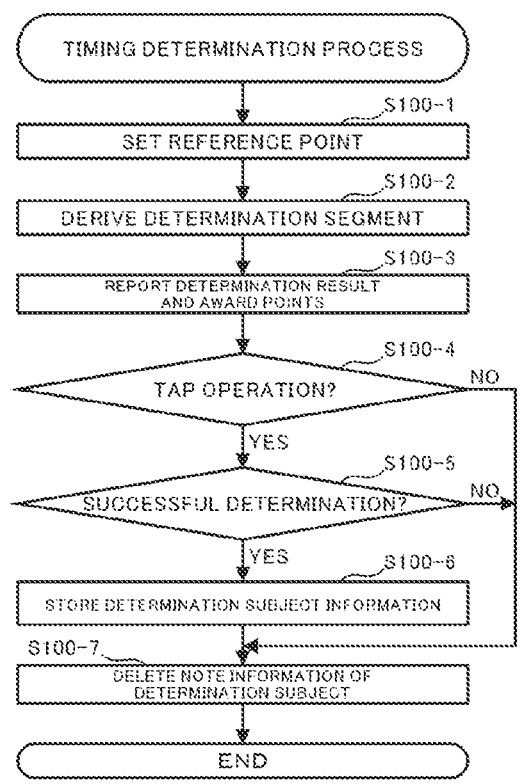
FIG. 23 is a flowchart for explaining an example timing determination process at the player terminal.

FIG. 23 is a flowchart for explaining an example timing determination process (S100) at the player terminal 1. Note that the same timing determination process (S100) is executed in both the normal mode and the special mode here. The timing determination unit 322a sets the reference point of the note information serving as a determination subject on the basis of the determination criterion information stored in the determination-criterion-information storage unit 344 (S100-1). Then, the timing determination unit 322a derives one of the first determination segment to the fifth determination segment according to the difference between the current frame value updated in S40 and the reference point (S100-2).

The game control unit 324a reports the result of determination, and awards points on the basis of the result of determination (S100-3). Although not described in detail, here, the game control unit 324a awards points while reflecting the abilities of the characters. Furthermore, if the identified operation is a tap operation (YES in S100-4), and if the result of determination derived in S100-2 is a successful determination (YES in S100-5), the timing determination unit 322a stores information identifying the note information identified as a determination subject (determination subject information) in the determination-subject-information storage unit (see FIG. 15A) in the operation-information storage unit 350 (S100-6).

Furthermore, the timing determination unit 322a deletes the note information that has served as a subject of the timing determination process from the note-extraction-information storage unit 342 or from the subject-note-extraction-information storage unit 346 (S100-7).

Figure 24:
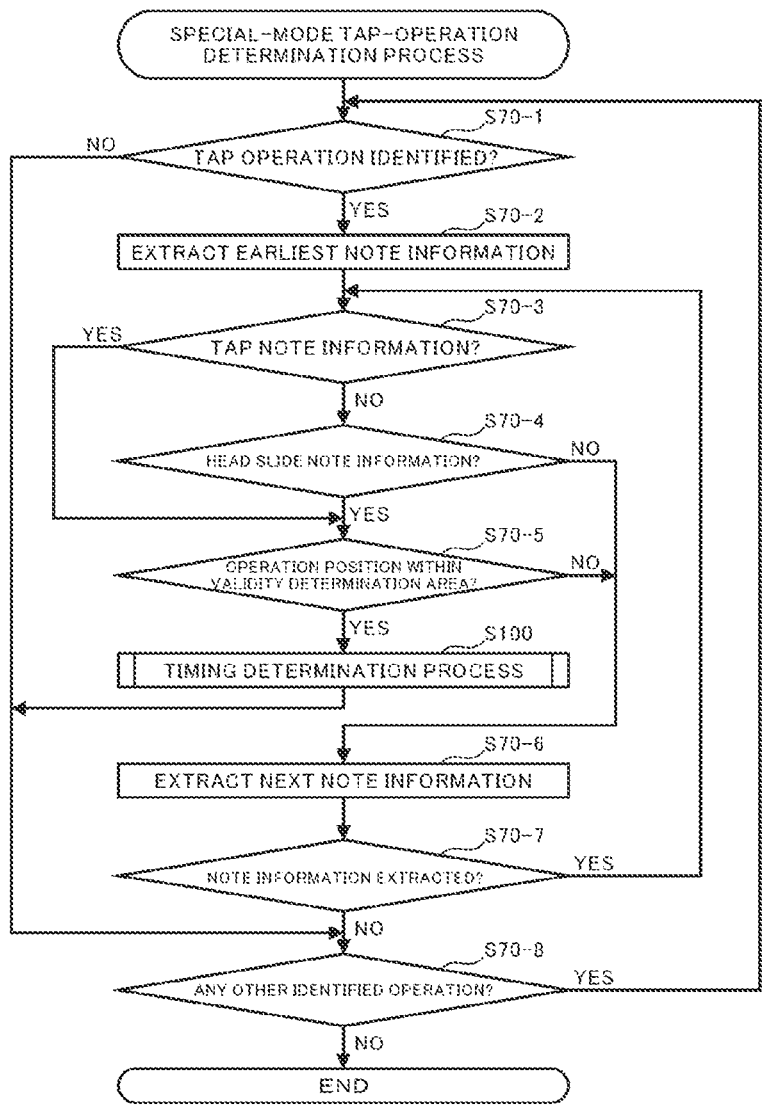
FIG. 24 is a flowchart for explaining an example special-mode tap-operation determination process at the player terminal.

FIG. 24 is a flowchart for explaining an example special-mode tap-operation determination process (S70) at the player terminal 1. In the case where it is determined in S50 that a tap operation is detected (YES in S70-1), the game control unit 324a extracts the earliest item of note information having the reference point within the prescribed frames on the basis of the subject-note extraction information stored in the subject-note-extraction-information storage unit 346 (S70-2).

If the note information extracted at this time is tap note information or head slide note information (YES in S70-3 or YES in S70-4), the validity determination unit 320a determines whether or not the operation position falls within the validity determination area VA (S70-5). Here, the validity determination unit 320a determines whether or not the operation position falls within the validity determination area VA on the basis of the validity determination area information stored in the validity-determination-area-information storage unit 348 and the operation position information stored in the operation-information storage unit 350. If the operation position falls within the validity determination area VA (YES in S70-5), the timing determination unit 322*a* executes the timing determination process (S100) described above.

Furthermore, in the case where no note information is extracted in S70-2 or in the case where the extracted note information is neither tap note information nor head slide note information (NO in S70-4), the game control unit 324*a* extracts the next item of note information having the reference point within the prescribed frames on the basis of the subject-note extraction information (S70-6). At this time, the process is repeated from S70-3 if note information is extracted (YES in S70-7), and the tap operation is handled as being invalid if no note information is extracted (NO in S70-7).

Then, the process is repeated from S70-1 if there is any other identified operation (YES in S70-8), and the special-mode tap-operation determination process is terminated if there is no other identified operation (NO in S70-8).

Figure 25:
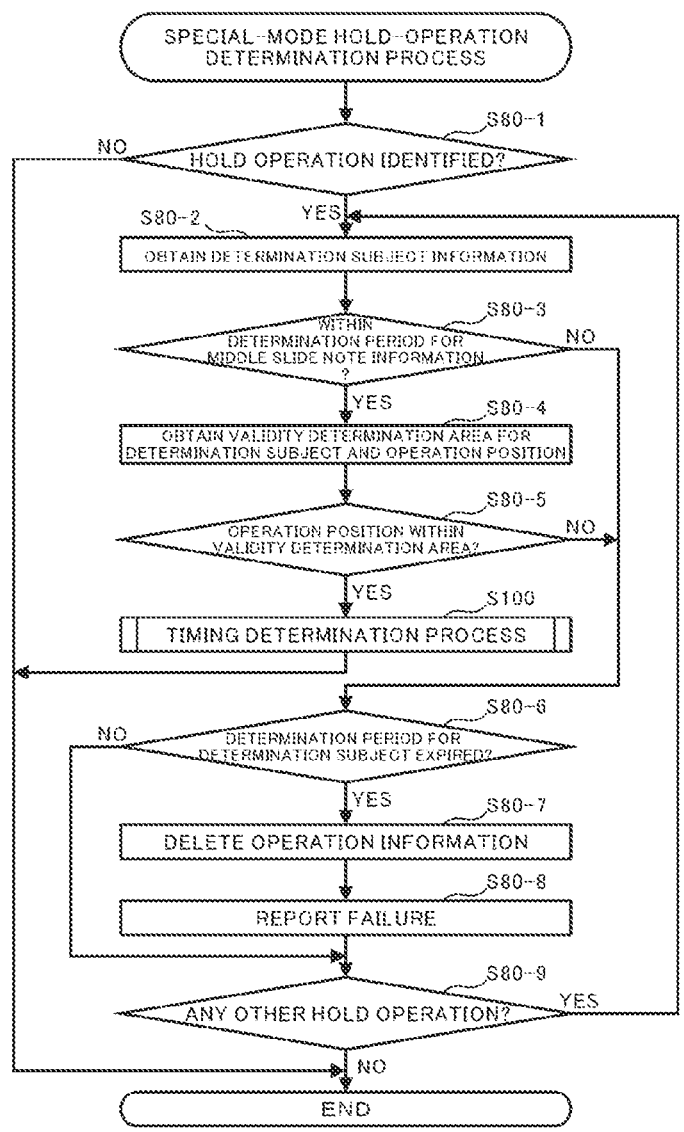
FIG. 25 is a flowchart for explaining an example special-mode hold-operation determination process at the player terminal.

FIG. 25 is a flowchart for explaining an example special-mode hold-operation determination process (S80) at the player terminal 1. In the case where it is identified in S50 that a hold operation is detected (YES in S80-1), the game control unit 324*a* obtains the determination subject information in the storage area corresponding to the hold operation from the operation-information storage unit 350 (S80-2).

Then, if the obtained determination subject information is middle slide note information and the current timing falls within the determination period thereof (YES in S80-3), the validity determination unit 320*a* obtains the validity determination area information of the determination subject, stored in the validity-determination-area-information storage unit 348, and the operation position information stored in the operation-information storage unit 350 (S80-4). Then, the validity determination unit 320*a* determines whether or not the operation position falls within the validity determination area VA (S80-5). If the operation position falls within the validity determination area VA (YES in S80-5), the timing determination unit 322*a* executes the timing determination process (S100) described above.

Furthermore, if the current timing does not fall within the determination period for the determination subject (NO in S80-3) or if the operation position falls outside the validity determination area VA (NO in S80-5), the game control unit 324*a* determines whether the determination period for the determination subject has expired (S80-6). If the determination period for the determination subject has expired (YES in S80-6), the operation-information deriving unit 318*a* deletes the operation information associated with the operation, stored in the operation-information storage unit 350 (S80-7), and the game control unit 324*a* reports that the operation has failed (S80-8).

Then, the process is repeated from S80-2 if there is any other identified hold operation (YES in S80-9), and the special-mode hold-operation determination process is terminated if there is no other identified hold operation (NO in S80-9).

Figure 26:
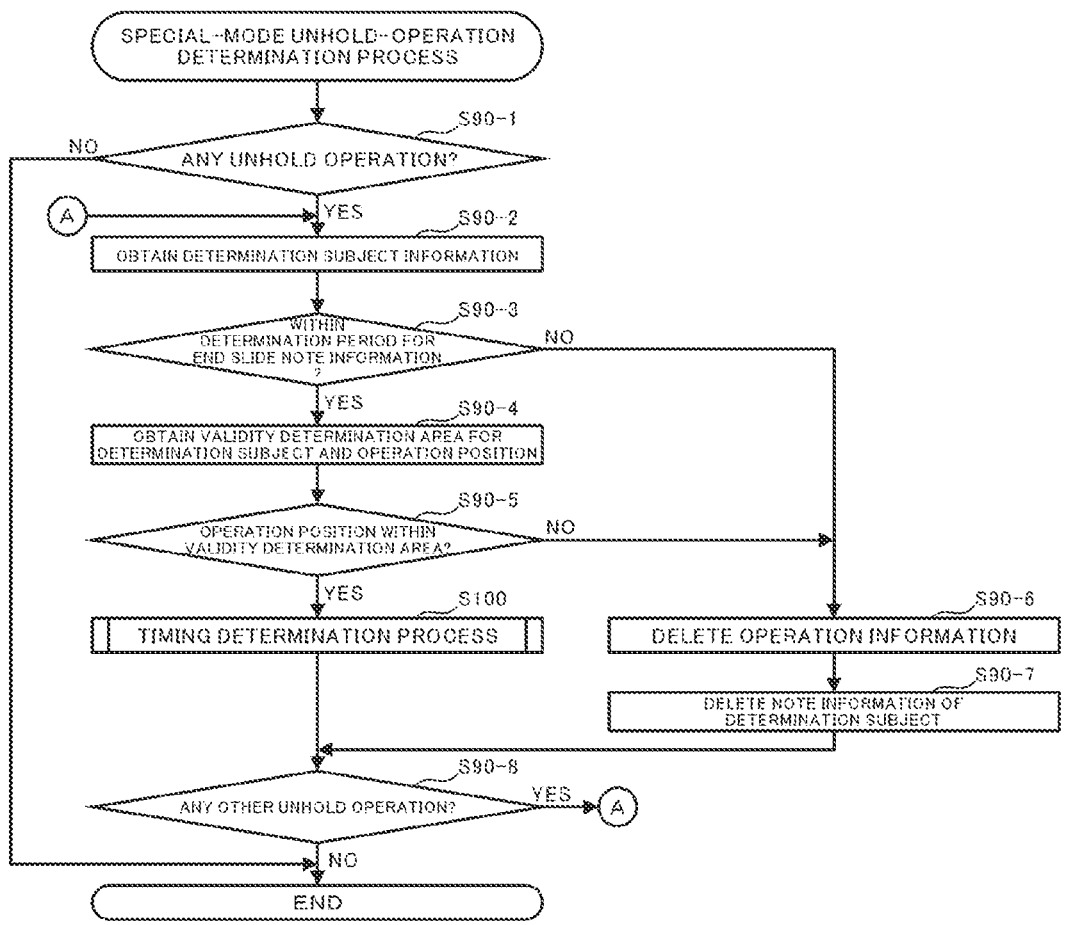
FIG. 26 is a flowchart for explaining an example special-mode uphold-operation determination process at the player terminal.

FIG. 26 is a flowchart for explaining an example special-mode unhold-operation determination process (S90) at the player terminal 1. In the case where it is determined in S50 that an unhold operation is detected (YES in S90-1), the game control unit 324*a* obtains the determination subject information in the storage area corresponding to the unhold operation from the operation-information storage unit 350 (S90-2).

Then, if the obtained determination subject information is end slide note information and the current timing falls within the determination period thereof (YES in S90-3), the validity determination unit 320*a* obtains the validity determination area information of the determination subject, stored in the validity-determination-area-information storage unit 348, and the operation position information stored in the operation-information storage unit 350 (S90-4). Then, the validity determination unit 320*a* determines whether or not the operation position falls within the validity determination area VA (S90-5). If the operation position falls within the validity determination area VA (YES in S90-5), the timing determination unit 322*a* executes the timing determination process (S100) described above.

Furthermore, if the current timing does not fall within the determination period for the determination subject (NO in S90-3) or if the operation position falls outside the validity determination area VA (NO in S90-5), the operation-information deriving unit 318*a* deletes the operation information associated with the operation, stored in the operation-information storage unit 350 (S90-6). Furthermore, the timing determination unit 322*a* deletes the note information that has served as the subject of the timing determination process from the subject-note-extraction-information storage unit 346 (S90-7).

Then, the process is repeated from S90-2 if there is any other identified uphold operation (YES in S90-8), and the special-mode uphold-operation determination process is terminated if there is no other identified uphold operation (NO in S90-8).

Although an aspect of an embodiment has been described above with reference to the accompanying drawings, it goes without saying that the present invention is not limited to the embodiment described above. It would be obvious that a person skilled in the art could conceive of various kinds of modifications or improvements within the scope recited in the claims, and it would be understood that those modifications and improvements obviously fall within the technical scope of the present invention.

In the embodiment described above, the result of determination for an operation timing is derived according to the difference between the reference point set for a note N and the input timing of an operation on the basis of the time elapsed (the number of frames) from the start of the rhythm game. However, the method of determination for an operation timing is not limited to the above. For example, a range (area) in which a note N overlaps a target object corresponding to a target coordinate point set for the note N may be derived, and the result of determination may be derived on the basis of that range.

In the embodiment described above, the operation modes of operations that are input to the touchscreen 26 are broadly classified into tap operation, flick operation, hold operation, and uphold operation. Alternatively, only some of these operation modes may be provided, or other operation modes may be provided. In either case, as long as prescribed operation information is derived on the basis of an operational input to the touchscreen 26, there is no particular limitation to the specific content thereof.

In the embodiment described above, two game modes, namely, the normal mode and the special mode, are provided. Alternatively, only one game mode may be provided, or three or more game modes may be provided. Furthermore, each of the objects displayed on the touchscreen 26 in the embodiment described above is merely an example.

In the embodiment described above, target objects and specific notes (specific objects) are associated with target coordinate points. However, without limitation to target coordinate points, for example, target objects and specific notes (specific objects) may be associated with prescribed areas or objects. That is, it suffices to display target objects and specific notes (specific objects) in association with some targets, and there is no limitation to the targets. Furthermore, in the embodiment described above, a specific note is associated with a plurality of mutually adjacent targets. Here, a plurality of mutually adjacent targets, or targets located adjacent, refer to targets located at mutually closest positions.

Furthermore, the control processes in the embodiment described above are merely examples. In the embodiment described above, the control processes for executing the game are executed by the player terminal 1 and the server 100. That is, the information processing system S, which is a client-server system including the player terminal 1 and the server 100, functions as a game device G. Alternatively, for example, the control processes for executing the game may be executed by the player terminal 1 alone. In this case, the player terminal 1 alone functions as a game device G.

Furthermore, an information processing program for realizing the game in the embodiment described above may be stored in a computer-readable storage medium. Furthermore, the embodiment described above may be embodied in the form of an information processing method that realizes the functions and the steps shown in the flowcharts.

What is claimed is:

1. A non-transitory computer readable medium storing a program causing a computer to execute a method comprising:
    displaying a plurality of target objects on a plurality of mutually spaced positions on a touchscreen;
    moving a specific object from a prescribed start position to a plurality of adjacent target objects that are adjacent to each other among the plurality of target objects, the specific object simultaneously arriving at the plurality of adjacent target objects;
    detecting a prescribed operation that is input to the touchscreen in connection with moving the specific object;
    determining whether the prescribed operation is input within a validity determination area including at least the plurality of adjacent target objects and an area therebetween;
    determining whether the prescribed operation is input at a prescribed timing;
    switching a first game mode in which the specific object appears, to a second game mode in which a number of target objects displayed is fewer than in the first game mode and the specific object does not appear; and
    moving, in the second game mode, a non-specific object from the prescribed start position to a first target object of the plurality of target objects, the non-specific object arriving at only the first target object.

2. The non-transitory computer readable medium according to claim 1,
    wherein the validity determination area of a respective target object among the plurality of target objects includes a corresponding area that is larger than a display area of the respective target object and that includes at least a middle position between a position where the respective target object is displayed and an adjacent position where an adjacent target object is displayed.

3. A game device comprising a computer configured to execute a method comprising:
    displaying a plurality of target objects on a plurality of mutually spaced positions on a touchscreen;
    moving a specific object from a prescribed start position to a plurality of adjacent target objects that are adjacent to each other among the plurality of target objects, the specific object simultaneously arriving at the plurality of adjacent target objects;
    detecting a prescribed operation that is input to the touchscreen in connection with moving the specific object;
    determining whether the prescribed operation is input within a validity determination area including at least the plurality of adjacent target objects and an area therebetween;
    determining whether the prescribed operation is input at a prescribed timing;
    switching a first game mode in which the specific object appears, to a second game mode in which a number of target objects displayed is fewer than in the first game mode and the specific object does not appear; and
    moving, in the second game mode, a non-specific object from the prescribed start position to a first target object of the plurality of target objects, the non-specific object arriving at only the first target object.

4. An information processing method comprising:
    displaying a plurality of target objects on a plurality of mutually spaced positions on a touchscreen;
    moving a specific object from a prescribed start position to a plurality of adjacent target objects that are adjacent to each other among the plurality of target objects, the specific object simultaneously arriving at the plurality of adjacent target objects;
    detecting a prescribed operation that is input to the touchscreen in connection with moving the specific object;
    determining whether the prescribed operation is input within a validity determination area including at least the plurality of adjacent target objects and an area therebetween; and
    determining whether the prescribed operation is input at a prescribed timing;
    switching a first game mode in which the specific object appears, to a second game mode in which a number of target objects displayed is fewer than in the first game mode and the specific object does not appear; and
    moving, in the second game mode, a non-specific object from the prescribed start position to a first target object of the plurality of target objects, the non-specific object arriving at only the first target object.

* * * * *